Nov. 30, 1965    LAN J. WONG    3,220,549
METHOD AND APPARATUS FOR DISCRIMINATING BETWEEN DESIRED
AND UNDESIRED DOCUMENTS
Filed June 8, 1964    10 Sheets-Sheet 1
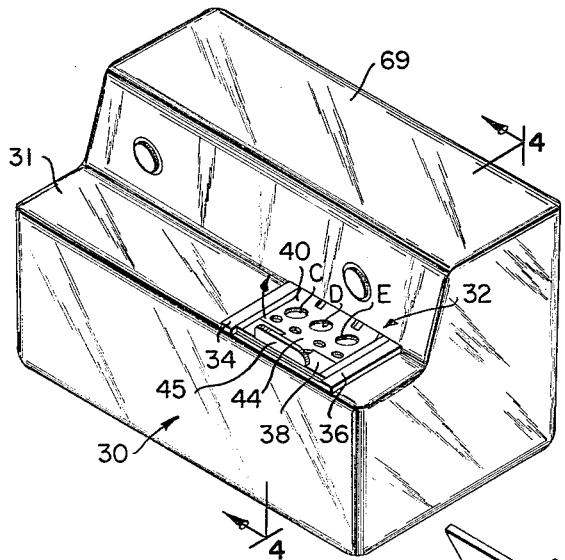
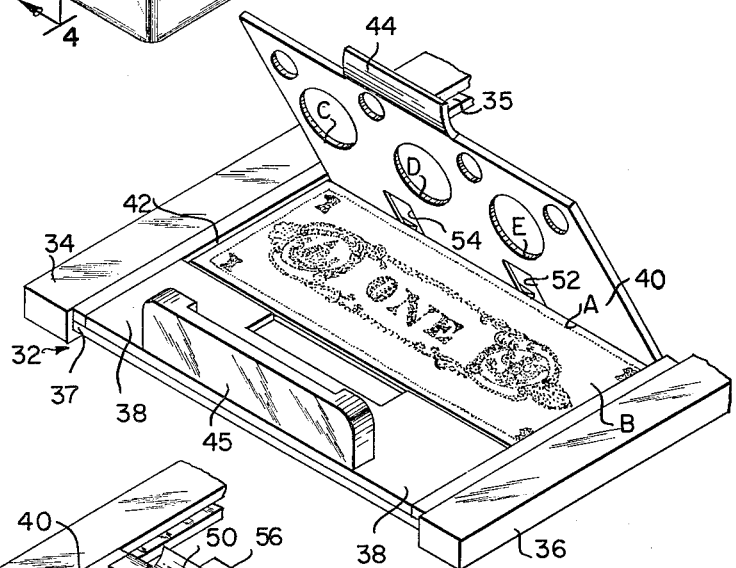
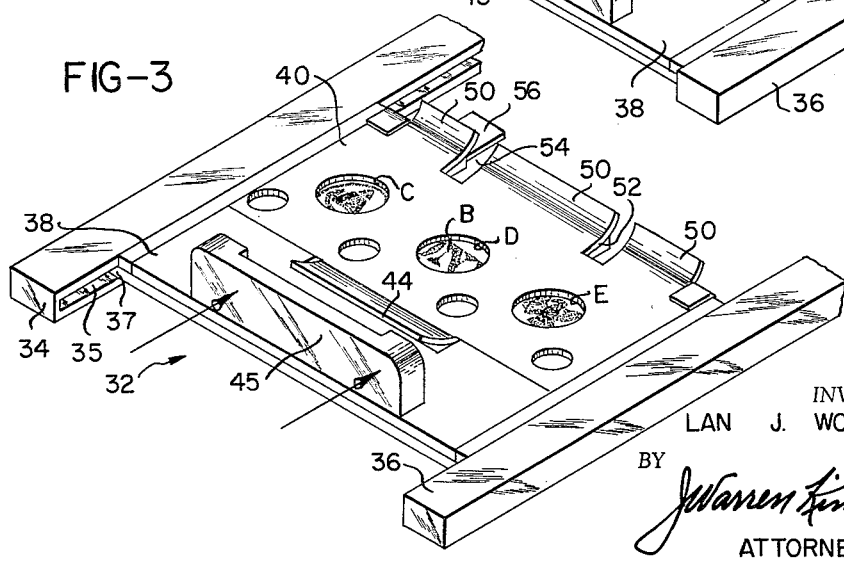
*INVENTOR.*
LAN J. WONG
BY
*J. Warren Kinney Jr.*
ATTORNEY

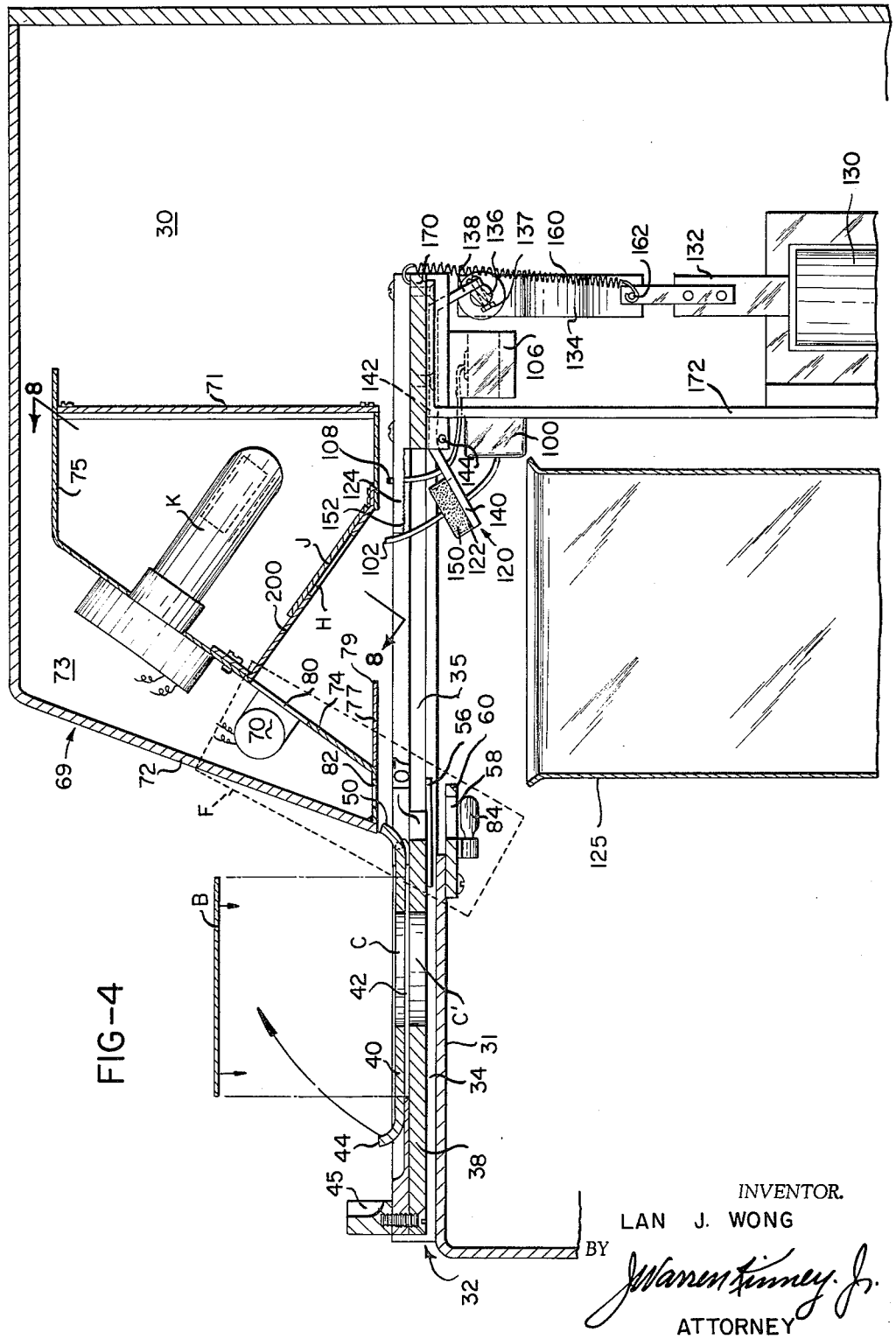

INVENTOR.
LAN J. WONG
BY
J. Warren Kinney Jr.
ATTORNEY

Nov. 30, 1965     LAN J. WONG     3,220,549
METHOD AND APPARATUS FOR DISCRIMINATING BETWEEN DESIRED
AND UNDESIRED DOCUMENTS
Filed June 8, 1964     10 Sheets-Sheet 4

INVENTOR.
LAN J. WONG
BY
*Warren Kinney Jr.*
ATTORNEY

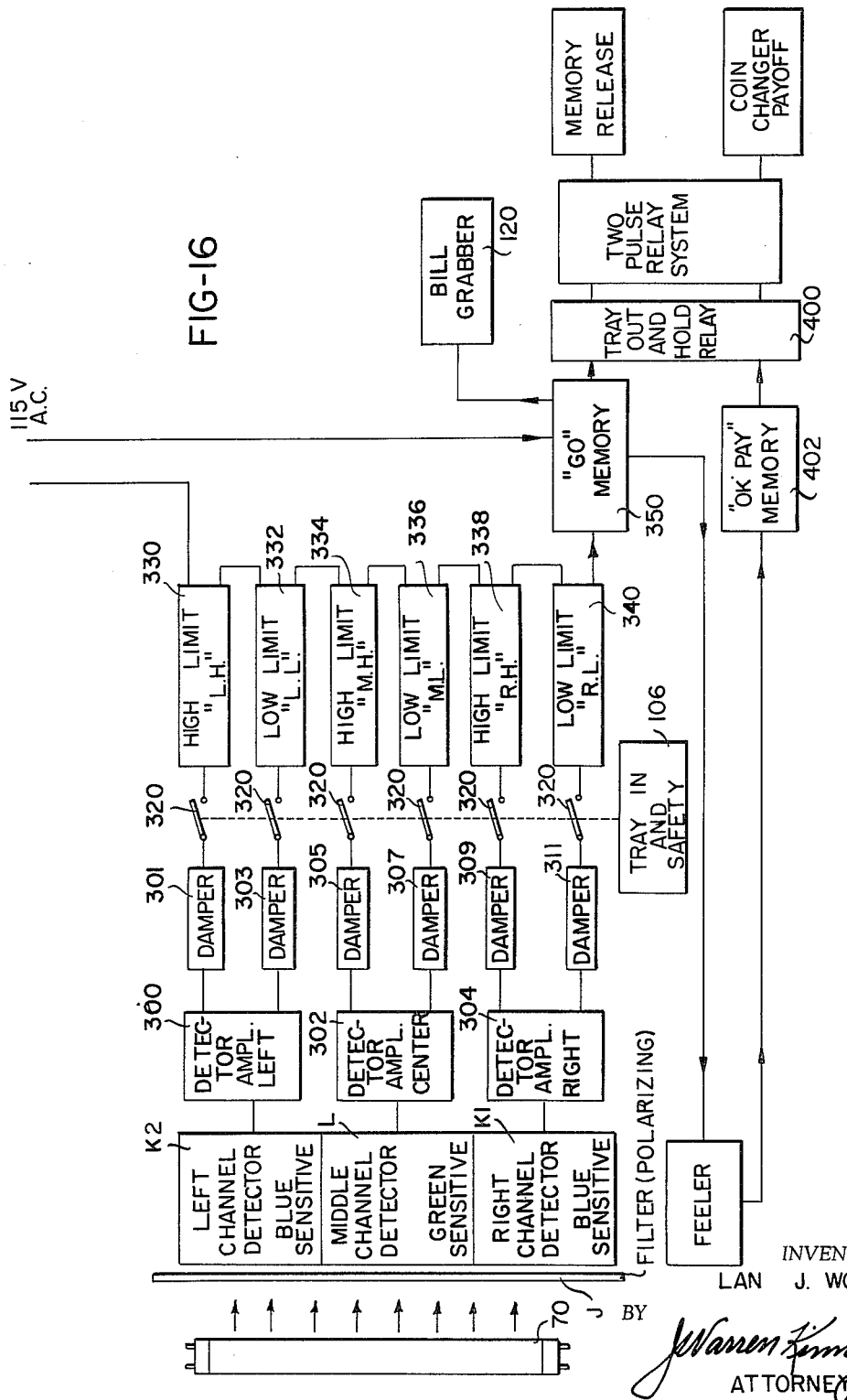

Nov. 30, 1965  LAN J. WONG  3,220,549
METHOD AND APPARATUS FOR DISCRIMINATING BETWEEN DESIRED
AND UNDESIRED DOCUMENTS
Filed June 8, 1964  10 Sheets-Sheet 7
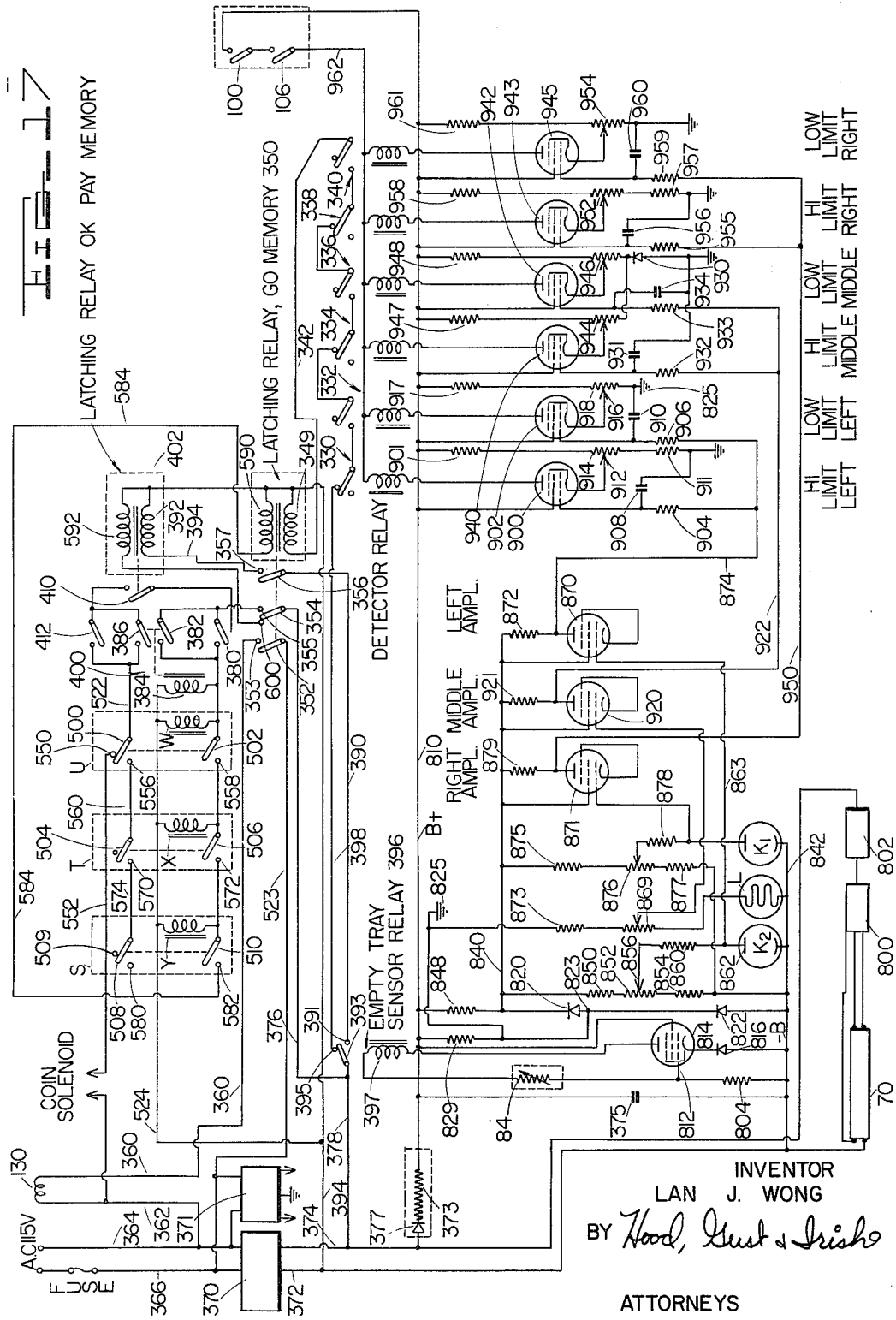
INVENTOR
LAN J. WONG
BY Hood, Gust & Irish
ATTORNEYS

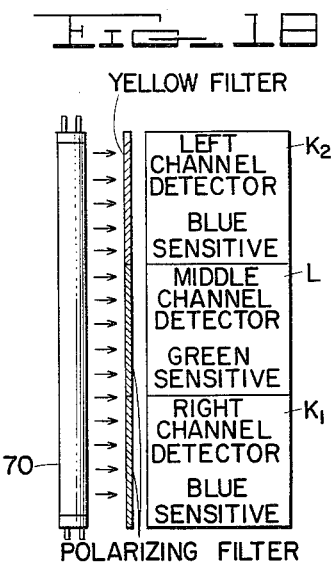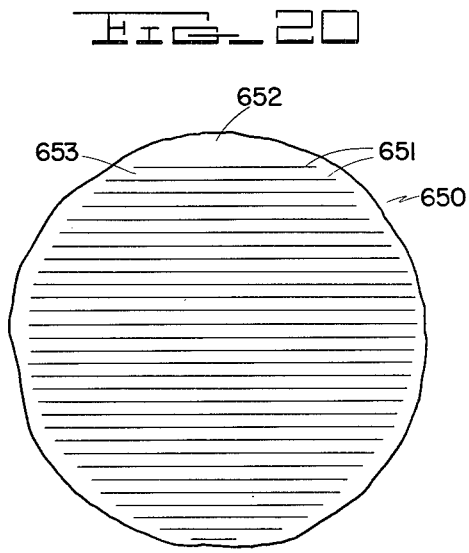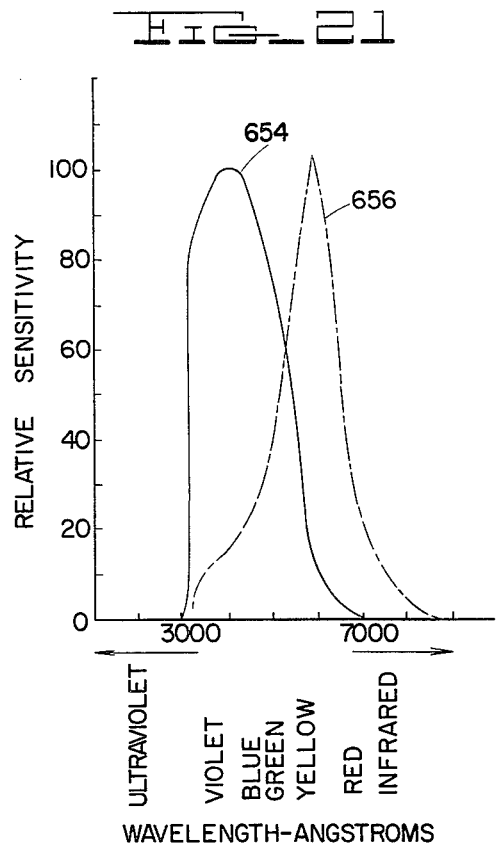

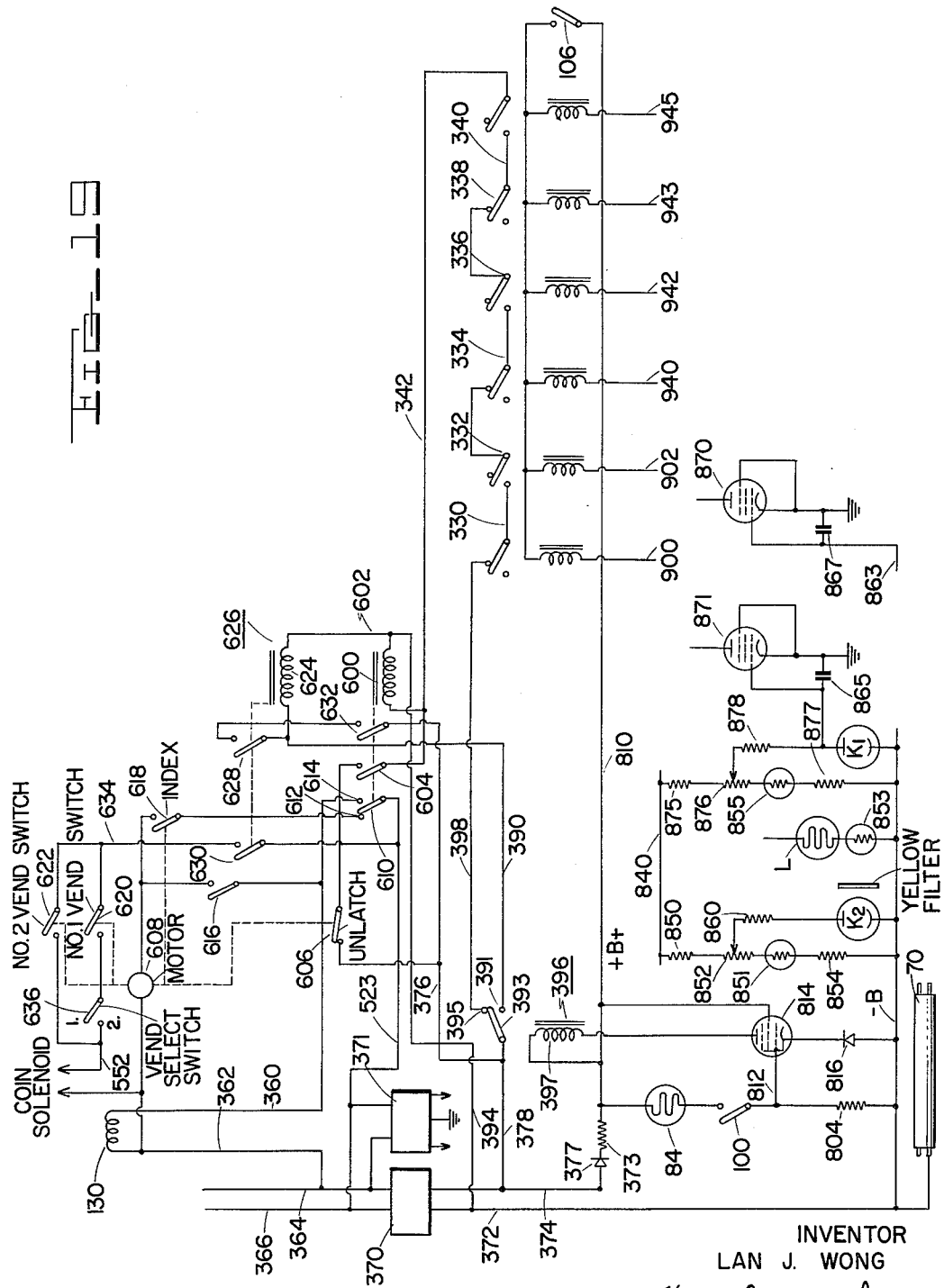

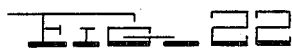
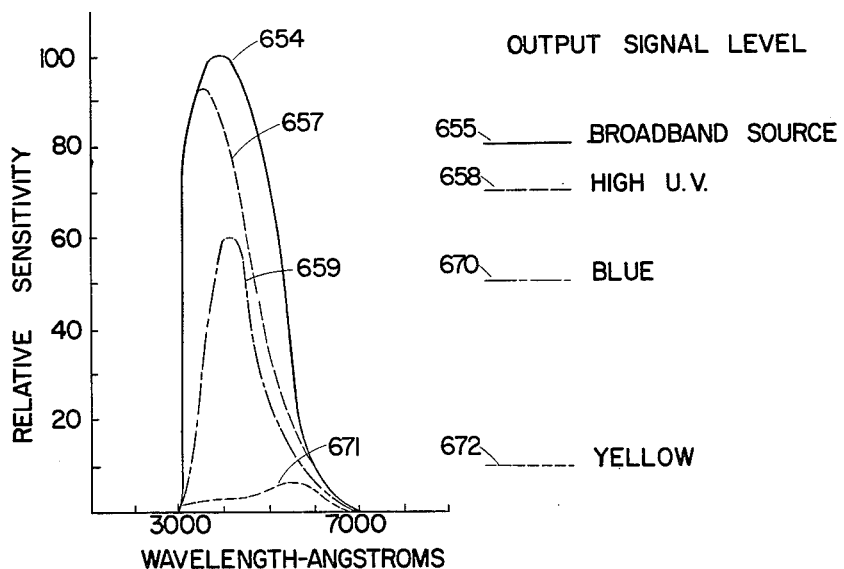
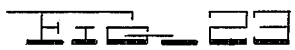
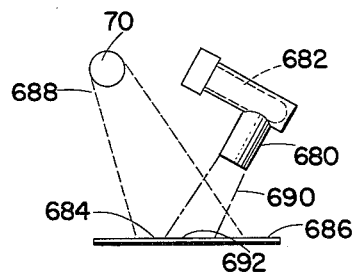

United States Patent Office 3,220,549
Patented Nov. 30, 1965

3,220,549
METHOD AND APPARATUS FOR DISCRIMINATING BETWEEN DESIRED AND UNDESIRED DOCUMENTS
Lan J. Wong, Cincinnati, Ohio, assignor, by mesne assignments, to Vendit, Inc., Anderson, Ind., a corporation of Indiana
Filed June 8, 1964, Ser. No. 375,412
21 Claims. (Cl. 209—111.6)

This invention relates generally to methods and apparatus for discriminating between desired and undesired documents, such as discriminating between genuine paper currency of a given denomination and counterfeit or foreign paper currency, or genuine currency of a different denomination, and more particularly to the method and apparatus for performing such discrimination by spectral analysis of light reflected from a surface of a document being inspected. This application is a continuation-in-part of my application Serial No. 256,410 filed February 5, 1963, now abandoned.

Numerous methods and apparatus have been proposed for discriminating between desired and undesired paper currency, the usual application for such apparatus being for making change and/or actuating a vending machine. In the most common type of such prior apparatus as described and illustrated in Patent No. 3,108,693 to W. A. Patzer, the discrimination is provided by a plurality of light-responsive cells underlying different areas of the currency and respectively responding to the quantity of light transmitted through those areas to provide an indication of the acceptability of the currency. Such apparatus, however, provides minimum response to color variations in the ink, paper, etc. since the transmission of light through the currency largely desensitizes any color effects in the transmitted light impinging upon the light-responsive cells, the printing on the several areas of the currency through which light is transmitted merely contributing varying degrees of opaqueness. Thus it has been found that apparatus in which light transmission through the currency is relied upon solely for discrimination will accept certain counterfeit or foreign currency in which the light transmission characteristics of the areas selected for inspection correspond closely to those of an acceptable piece of currency.

In another form of prior apparatus for discriminating between acceptable and unacceptable currency, as described and illustrated in Patent No. 2,950,799 to R. L. Timms, a piece of currency being inspected is sequentially subjected to a plurality of different tests including, for example, reflectivity to discriminate between old and new currency, thickness, electrical resistance, density, fluorescence, and matching of the printing with that of an acceptable piece of currency. Apparatus of this type is, however, characterized by its complexity and relatively slow operation by virtue of the numerous tests which are sequentially made.

It is therefore desirable to provide a method and apparatus for discriminating between desirable and undesirable documents with higher accuracy than heretofore provided, such apparatus being characterized by its relative simplicity and rapid response. It is further desirable in the case of apparatus for discriminating between acceptable and unacceptable currency to provide for rejection of a minimum amount of genuine currency of proper denomination due to such factors as a dirty or wrinkled condition, while nevertheless rejecting all unacceptable currency, i.e., counterfeit or foreign currency or genuine currency of the wrong denomination.

I have found that discrimination between acceptable and unacceptable documents, particularly paper currency, may be accomplished with great accuracy by analysis of the spectral content of light reflected from a plurality of preselected discrete areas of the document being inspected. Thus, not only is the intensity of the light reflected from a given discrete area on one surface of a document being inspected responsive to the mechanical characteristics of such printing as may appear in that area, i.e., an entirely white area would provide maximum reflection while an entirely black area would provide minimum reflection, but further and most importantly the spectral content of the reflected light will depend upon the background color, the color of the ink and the mechanical characteristics of the printing; each of these characteristics of a given discrete area of the document being inspected contributes its own spectral characteristics which are integrated by the light-sensitive device receiving the reflected light. Thus, by analyzing the spectral response of light reflected from a plurality of different preselected discrete areas on the surface of a document being inspected, it is possible to discriminate with great accuracy between acceptable and unacceptable documents.

It is accordingly an object of the invention to provide an improved method for discriminating between desired and undesired documents.

Another object of the invention is to provide improved apparatus for discriminating between desired and undesired documents.

A further object of the invention is to provide an improved method and apparatus for discriminating between desired and undesired documents by spectral analysis of light reflected therefrom.

A further object of the invention is to provide an improved method and apparatus for discriminating between desired and undesired documents by spectral analysis of light reflected from a plurality of preselected discrete areas on one surface of the document.

Yet another object of the invention is to provide an improved method and apparatus for discriminating between desired and undesired documents by spectral analysis of light reflected therefrom which will reject a minimum number of acceptable documents while nevertheless rejecting a maximum number of unacceptable documents.

The invention in its broader aspects provides light source means emitting visible light in a plurality of color sections including respective color components existing on one surface of a desired document. The document to be inspected is held in stationary relationship with respect to the light source with the surface of interest exposed to the source so as to receive the light therefrom. A plurality of light-sensitive means are provided which respectively develop electrical signals having amplitudes responsive to the spectral content of the light received thereby, these light sensitive means being disposed respectively to receive light reflected from a plurality of preselected discrete areas of the one surface of the document thereby respectively to develop signals in response to the spectral characteristics of the areas. These signals are analyzed and an indicating signal is provided when the spectral content of the light reflected from each of the areas of the document being inspected conforms to that of a desired document.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a perspective view of a device incorporating one embodiment of the present invention;

FIG. 2 is an enlarged view of the bill-receiving sliding tray of the device of FIG. 1 with the bill-plate elevated to permit reception of a bill;

FIG. 3 is a view similar to FIG. 2, but showing the tray in the process of being advanced into the device for presenting the bill to the detection apparatus thereof;

FIG. 4 is a sectional view taken along line 4—4 of FIG. 1;

FIG. 16 is a schematic block-type diagram of the various cycles to which the bill is subjected;

FIG. 17 is a schematic diagram of the electric circuitry of one embodiment of the invention;

FIG. 18 is a fragmentary schematic diagram similar to FIG. 16 showing the preferred embodiment of the invention;

FIG. 19 is a fragmentary schematic diagram of the electric circuitry of the preferred embodiment of the invention;

FIG. 20 is a diagram schematically showing a typical discrete area of a piece of currency from which light is reflected and useful in explaining the mode of operation of the invention;

FIG. 21 show typical sensitivity curves for light-sensitive devices employed in a specific embodiment of the invention;

FIG. 22 shows sensitivity curves for incident light having different spectral characteristics for a typical light-sensitive device and useful in explaining the mode of operation of the invention; and FIG. 23 is a fragmentary diagram illustrating another embodiment of the invention.

Referring now to FIGS. 1 through 17 of the drawings, there is shown a paper currency changing device incorporating one embodiment of the invention, the device comprising a housing shown generally at 30 and sliding-bill tray transport assembly 32. Bill-tray assembly 32 is normally positioned on the exterior of the housing 30, as shown in FIG. 1, for receiving a bill therein, as will be hereinafter more fully described. Bill-tray assembly 32 is then moved into the interior of the housing 30 to expose the bill to the discrimination apparatus which will remove the bill from the bill-tray assemby if the bill is found to be acceptable; if the bill is not found to be acceptable, it will not be removed from the bill-tray assembly 32 and will be returned upon withdrawal of the bill-tray assembly 32 from the interior of the housing 30 to its exterior position shown in FIG. 1.

Figure 5:
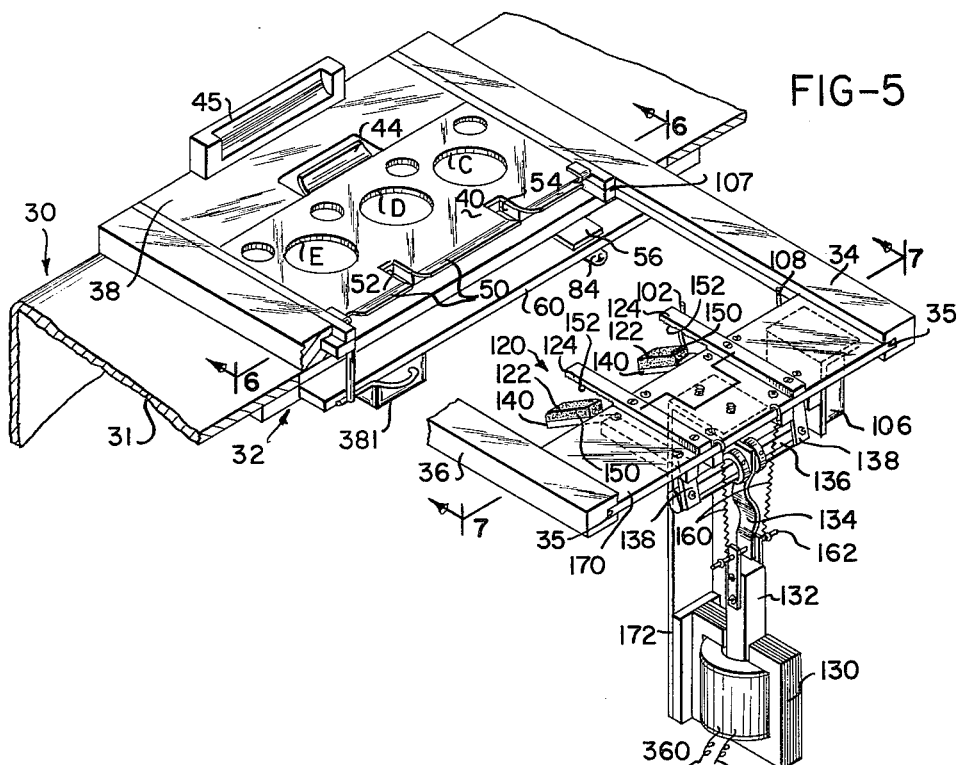
FIG. 5 is a fragmentary perspective view illustrating the relationship of the bill tray and the bill-grabbing mechanism.
Figure 6:
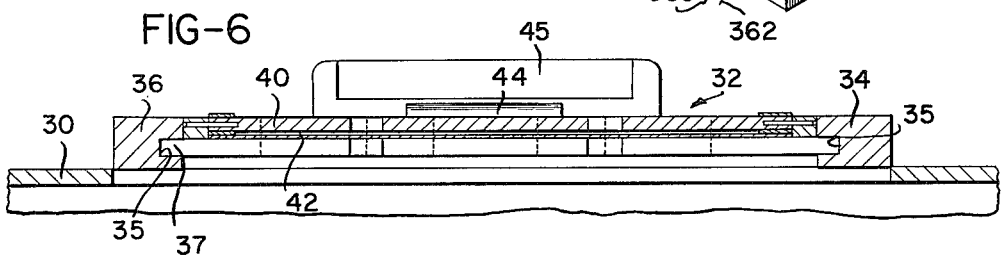
FIG. 6 is a sectional view taken along the line 6—6 of FIG. 5.
Figure 7:
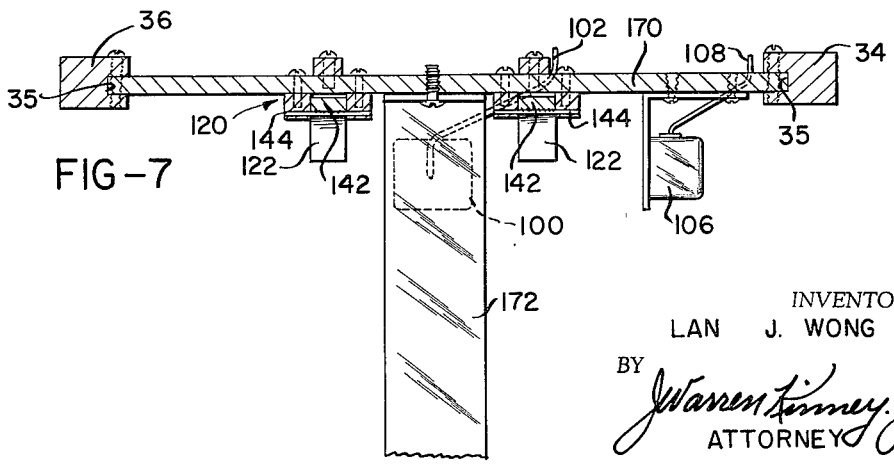
FIG. 7 is a sectional view taken along the line 7—7 of FIG. 5.
Figure 10:
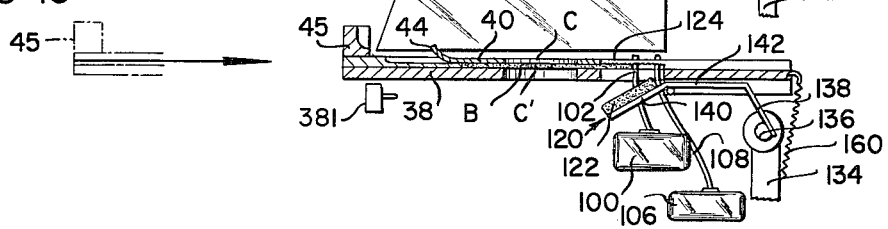
FIGS. 10 through 14 are views similar to FIG. 9, illustrating the relationship of the various parts of the device during a complete cycle occurring on presentation of an acceptable bill to the device.
Figure 11:
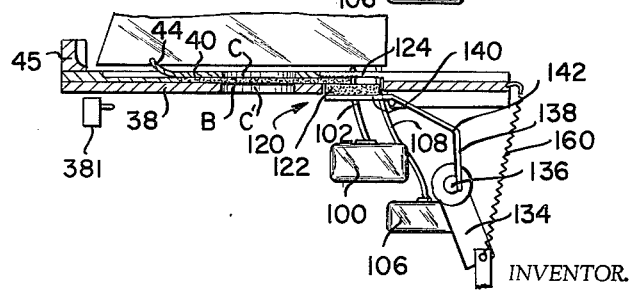

With particular reference now to FIGS. 2 through 7, a pair of transversely spaced rails 34, 36 are provided mounted on exterior ledge portion 31 of housing 30 and extending horizontally into the interior thereof. Each of the rails 34, 36 has an elongated slot 35 formed therein, slots 35 respectively accommodating sides 37 of stray 38 which is thereby mounted for sliding movement between a bill-receiving or loading position exteriorly of the housing 30, as shown in FIGS. 1 and 5, and a bill inspecting position interiorly of the housing 30 as shown in FIGS. 10 and 11.

Tray 38 has a recess or bill-receptive pocket 42 formed in its upper surface for receiving a bill to be inspected, as best seen in FIG. 2. A cover or bill-plate 40 is provided hingedly connected at its rear edge to the tray 38 so that when the cover 40 is raised as shown in FIG. 2, a bill may be placed in the recess 42, the inner surface of the cover adjacent to its hinged end providing in its raised position an abutment engageable with the rear edge A of the bill B for properly positioning the same. The cover 40 when lowered is received within the recess 42 thereby to flatten the bill B and to hold it in position for subsequent inspection. The forward edge of the cover 40 is provided with a handle member 44 to facilitate manual raising and lowering of the cover. Tray 38 is likewise provided with a hand grip member 45 at its forward end to permit manually moving the tray into the interior of the housing 30 for inspecting the bill B therein and subsequently returning the tray to its exterior position.

In this embodiment of the invention, cover 40 is provided with three inspection apertures C, D, and E which expose preselected areas of the upper surface of the bill B which are to be inspected by the device. In a specific embodiment of the invention arranged for inspection of one dollar United States currency, the bill B is positioned in the recess 42 with its green side facing upwardly and thus exposed by the apertures C, D, and E; the apertures C and E are dimensioned and arranged to expose those portions on the green side of the bill containing the pyramid and the United States Eagle, respectively, and the aperture D is dimensioned and disposed to expose all of the letter N and adjacent portions of the O and E of the word "ONE" appearing between the pyramid and eagle symbols. It will be understood that a greater number and/or different positioning of the inspection apertures may be provided in order further to improve the discrimination or to provide optimum discrimination for other types of currency or documents other than currency.

Referring particularly to FIG. 3, the rear or back end of cover 40 terminates in an upturned lip 50 having slots 52, 54 formed therein for a purpose to be hereinafter described. As seen in FIGS. 3 and 4, a light shield 56 is secured to the rear portion of tray 38 and projects rearwardly therefrom. A baffle member 60 is secured to the rear edge of ledge portion 31 of the housing 30 and extending rearwardly therefrom and has an aperture 58 formed therein exposing a light-sensitive device 84 mounted on the lower side of the member 60. As best seen in FIG. 4, when the tray 38 is in its fully retracted or FULL OUT position, light shield 56 is in vertical alignment with member 60 and is thus positioned in light-obstructing relationship for light source 70 with respect to the aperture 58 and the light-sensitive device 84.

Still referring to FIG. 4, those portions which are included within the dotted outline F define what will be hereinafter referred to as the empty tray sensor portion of the device. Housing 30 includes a portion 69 extending upwardly from ledge portion 31 and having a forward wall 72. Positioned within the portion 69 of housing 30 is a mounting bracket assembly including a rear wall 71, forward wall 74, upper wall 75 and lower wall 77. Walls 72, 74 are spaced apart to define a cavity 73 within which light source 70 is provided; light source 70 may be suitably mounted on the wall 74. Light source 70 provides light for both the empty tray sensor portion F of the system and for the discrimination portion of the system. In the above-referred to specific embodiment for inspecting one dollar United States bills, light source 70 is a cool white or daylight fluorescent tube, both of which provide a reasonably broad band spectral emission with substantial emission in the blue to near ultra-violet section. The spectral content of the emission of the light source 70 is, however, of importance only with respect to the discrimination portion of the device, and thus a separate light source having spectral emission different from that of source 70 may be provided for the empty tray senor system F if so desired.

Lower wall 77 of the mounting bracket assembly is provided with an aperture 82 in alignment with light source 70, aperture 58 and member 60 and the light-sensitive device 84; it will be observed that when the tray 38 is in its fully retracted position as shown in FIGS. 1 and 4, light shield 56 prevents light from the light source 70 from reaching the light-sensitive source 84. Tray 38 has an aperture C′ formed therethrough in recess 42 underlying aperture C in cover 40 and communicating therewith when cover 40 is lowered and there is no bill B in the recess 42. Thus, it will be observed that when the slide 38 is moved forwardly to its FULL IN position within housing 30, or moved rearwardly from its FULL IN position toward its fully retracted or FULL OUT position, light from the light source 70 will pass through aperture C in cover 40, aperture C′ in tray 38 and aperture 58 in member 60 to impinge upon the light-sensitive device 84 when no bill is contained in the recess 42 of tray 38. However, if a bill is positioned in recess 42 either during movement of tray 38 forwardly toward its FULL IN position or rearwardly toward its FULL OUT position, the bill will prevent passage of light from source 70 through aperture C′ in tray 38 so that the light does not reach the light-sensitive device 84.

As will be hereinafter more fully described, it is desired to detect the presence and proper alignment of a bill in the tray 38, to detect when the tray is in its FULL IN position within housing 30, and to detect when the tray is in its FULL OUT position. A sensitive snap-action switch 100 is provided having normally open contacts (FIG. 17) and having an actuator finger 102 receivable within slot 54 in the cover 40 and corresponding slots formed in the rear edge of the tray 38. As seen in FIGS. 4 and 10, when bill B is properly positioned in the recess 42 of tray 38, the rear edge A thereof will contact and actuate finger 102 of switch 100 rearwardly as the tray 38 is moved to its FULL IN position thereby closing the contacts of switch 100.

Figure 9:
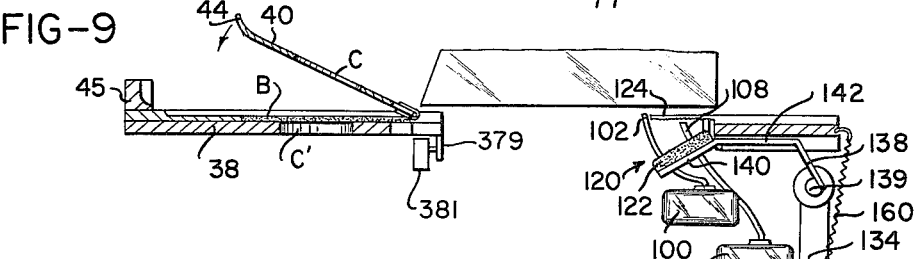
FIG. 9 is a fragmentary sectional view showing the relationship of the various parts of the device at the start of a detecting cycle.
Figure 13:
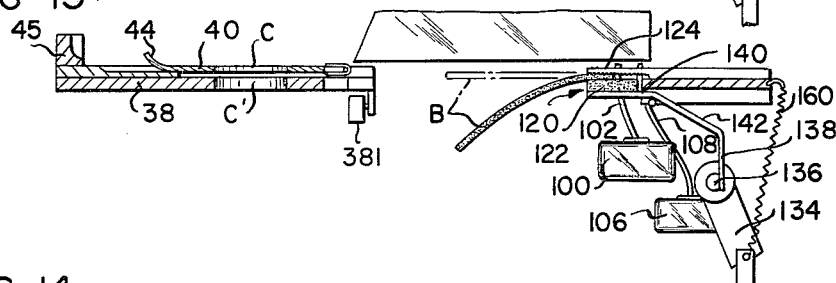
Figure 14:
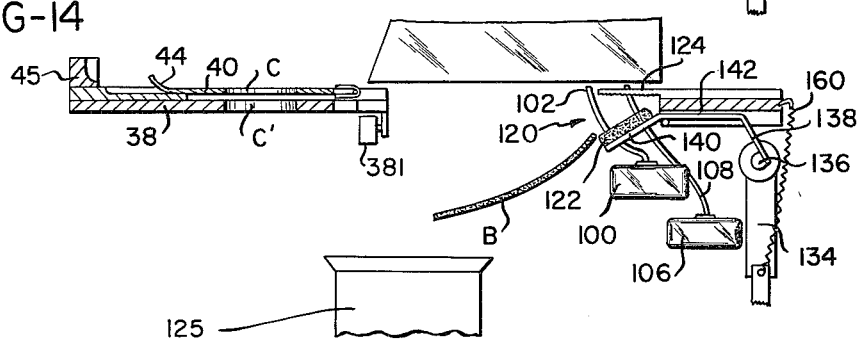

Another sensitive snap-action switch 106 is provided having normally open contacts (FIG. 17) and having an actuator finger 108. Finger 108 is adapted to be actuated by a projection 107 on the rear edge of tray 38 as the tray is moved into its FULL IN position thereby closing the contacts of switch 106. A third snap-action switch 381 is provided having normally open contacts 380, 412 (FIG. 17). Switch 381 is mounted on the lower surface of ledge portion 31 and is actuated to close its contacts 380, 412 by switch-actuating member 379 on the rear edge of tray 38 when the tray is in its FULL OUT position, as shown in FIGS. 9, 13 and 14.

Figure 12:
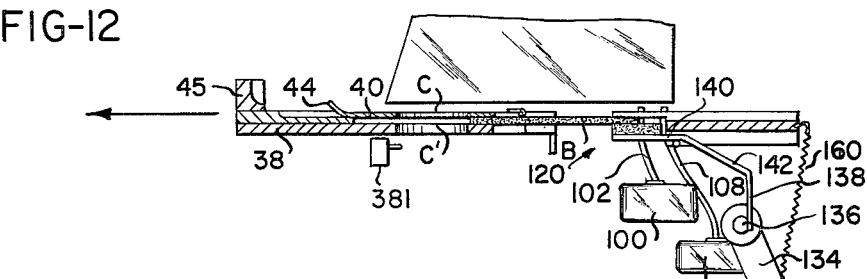

A bill-grabbing assembly 120 is provided within housing 30 supported on plate 170 spanning the rear ends of rails 34, 36. The bill-grabbing assembly 120 is actuated from its non-bill clamping position as shown in FIGS. 4, 5, 9 and 10 to its bill clamping position as shown in FIGS. 11, 12 and 13 in response to energization of solenoid 130. The grabber assembly includes a pair of pivotally movable jaws 122 and a pair of cooperating fixed or stationary jaws 124. Portions 142 of the movable jaws 122 intermediate their rear ends 138 and forward ends 140 are independently pivotally mounted by means of pin 144 which is mounted on plate 170. Resilient pads 150 are secured to and carried by the upper faces of the forward ends 140 of the movable jaws 122 and the under surfaces of the fixed jaws 124 may be serrated, as at 152, so as to cooperate with the pads 150 to enhance the clamping power of the grabber mechanism 120.

A cross rod 136 is provided having its opposite ends connected to the downwardly projecting rear end portions 138 of the movable jaws 122 by means of fastener members 137 which permit relative motion between the movable jaws 122 so that each of the pads 150 will firmly seat against the respective fixed jaw 124 despite the fact that the other movable jaw may already have engaged the surface of its respective fixed jaw. The movable jaws 122 are actuated by means of solenoid 130 having leads 362, 364 and mounted on bracket 172 which is secured to and depends from plate 170. Solenoid 130 has an armature or plunger 132 connected to the cross rod 136 by a resilient member 134. The movable jaws 122 are normally biased to their lower, non-bill clamping position by means of springs 160 which interconnect plunger 132 as at 162 and the support plate 170.

It will now be seen that energization of solenoid 130 will pull plunger 132 downwardly thus pivoting the movable jaws 122 about pin 144 so that their forward ends 140 swing upwardly so as to engage pads 150 with the fixed jaws 124.

Figure 8:
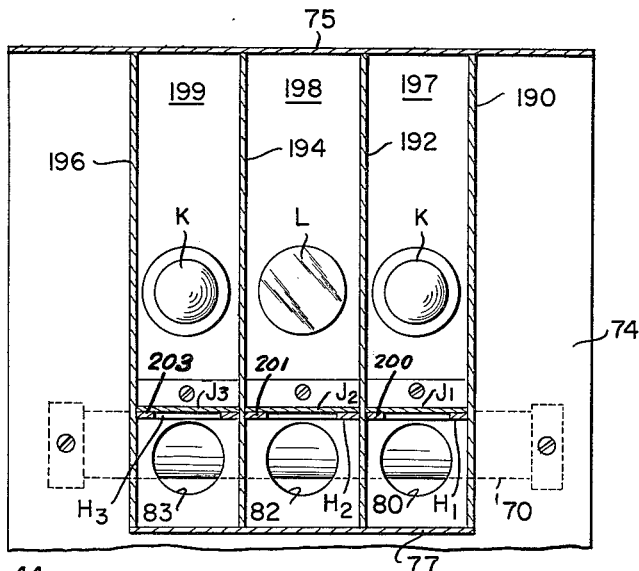
FIG. 8 is a sectional view taken along the line 8—8 of FIG. 4.

Referring now particularly to FIGS. 4 and 8 in which the discrimination portion of the device is illustrated, the lower wall 77 of the mounting bracket assembly has an enlarged aperture 79 which exposes cover 40 and the apertures C, D and E therein when the tray 38 is in its FULL IN position. The forward wall 74 on the mounting bracket assembly has three apertures 80, 81 and 83 formed therein respectively in alignment with the apertures C, D, and E in the cover 40 when the tray 38 is in its FULL IN position. Light source 70 is disposed behind the apertures 80, 81 and 83 in wall 74 so that light therefrom is directed through the apertures 80, 81, 83 and through the corresponding apertures C, D, and E of the cover 40 onto the discrete areas of the bill B exposed thereby when the tray 38 is in its FULL IN position. Vertically extending partition plates 190, 192, 194 and 196 extend between walls 71, 74 of the mounting bracket assembly respectively to define compartments 197, 198 and 199. Baffle plates 200, 201 and 203 respectively extend between lower wall 77 and forward wall 74 to close compartments 197, 198, 199. Baffle plates 200, 201, 203 respectively have apertures H1, H2 and H3 formed therein respectively in alignment with the apertures 80, 81, 83 in wall 74. Photosensitive devices K1, L and K2 are respectively positioned in the compartments 197, 198 and 199 being supported on the rear wall 74, as best seen in FIG. 4, these photosensitive devices K1, L and K2 being respectively exposed to the openings or apertures H1, H2 and H3 in the baffle plates 200, 201 and 203.

It will now be seen that when a bill B is positioned in recess 42 of tray 38 and cover member 40 lowered into the recess 42 thereby to clamp the bill in position, and when the tray 38 is moved into its FULL IN position in housing 30, light from the light source 70 will be directed through openings 80, 81, 83 in wall 70 and apertures C, D, and E in cover 40 onto the discrete areas of bill B exposed thereby, and will then be reflected from those areas through apertures H1, H2 and H3 in the baffle plates 200, 201 and 203 onto the respective photosensitive devices K1, L and K2. It will thus be observed that light from the light source 70 is simultaneously directed onto preselected discrete areas of the side of the bill selected for inspection, in the specific embodiment this being the green side of a United States one dollar bill, and is then simultaneously reflected from those discrete areas onto respective photosensitive devices.

Photosensitive devices K1, L and K2 respectively provide output signals having amplitudes responsive to the spectral content of the light received thereby. In a specific embodiment of the invention, the photosensitive devices K1 and K2 are phototubes chosen for maximum sensitivity to blue and ultraviolet light while the photosensitive device L is a photoconductive cell chosen for maximum sensitivity in the region of green light.

Suitable filters J1, J2 and J3 are provided respectively extending across the apertures H1, H2 and H3. In one embodiment of the invention, all of the filters J1, J2, J3 are polarizing filters employed to reduce the effects of glare in the reflected light. In a preferred embodiment, as shown in FIG. 18, one of the filters associated with one of the phototubes K1, K2, for instance filter J3, is a yellow-orange transmitting filter of the type which substantially attenuates the green, blue and ultra-violet sections of the reflected light passing therethrough so that the red, red-orange and yellow sections are transmitted more nearly without loss, the remaining filters J1 and J2 being polarizing filters as before. As will be hereinafter more fully described, the yellow-orange filter J3 is employed to provide a rejection signal in response to a color component of foreign currency, specifically the Mexican peso. With a fluorescent lamp employed for the light source 70, the polarizing filters J are oriented so that their axis of polarization is normal to the longitudinal axis of the tube 70.

It will be understood that the phototubes K1, K2 employed in the above-referred to specific embodiment are of the photo-emissive variety, their emission and thus their output signal amplitude varying in response to the intensity and spectral content of the reflected light received thereby. The photocell employed in the specific embodiment is of the photo-conductive variety and thus its resistance is varied thereby to provide an output signal having its amplitude varied in response to the intensity and spectral content of the reflected light which it receives. The output signals from the light-sensitive devices K1, L and K2 are respectively applied to detector-amplifier circuits 300, 302, 304 (FIG. 16) which in conjunction with high and low limit relays 330 and 332, 334, 336, 338, 340, respectively determine whether the output signals from each of the photosensitive devices K1, L and K2 is within predetermined upper and lower limits of amplitude. Thus, when each of the output signals from the photosensitive devices K1, L and K2 is above a predetermined lower amplitude limit and below a predetermined upper amplitude limit, an indicating signal is provided, as will be hereinafter more fully described, which indicates that the spectral content of the light reflected from each of the discrete areas of the bill B being inspected which are exposed by the apertures C, D, and E in the cover 40 corresponds to the spectral content of light reflected from corresponding areas of a genuine piece of currency of proper denomination.

Referring now to FIG. 17, power for the device is provided from a conventional source of 115 volt alternating current potential (not shown) applied by lines 364, 366 to a conventional stabilized power supply 370, such as a Sola constant voltage transformer CV–1. A conventional filament transformer 371 is also provided coupled across input lines 364, 366 for supplying filament voltages for the various tubes employed in the circuit. The stabilized output voltage from the power supply 370 is provided across lines 372, 374 with fluorescent tube 70 and a conventional starter 800 and ballast 802 being connected thereacross, as shown. Regulated voltage between B+ line 810 and B— line 842 is provided by a diode 377, resistor 373, and capacitor 375 in conventional fashion.

The empty tray sensor light-sensitive source 84, which may be a suitable photo-conductive cell is serially connected with resistor 804 across B+ line 810 and B— line 842 with the midpoint 812 between the photo-conductive cell 84 and resistor 804 being connected to the control grid of amplifier 814. The cathode of tube 814 is coupled to ground by zener diode 816 and its plate is serially coupled to B+ line 810 by operating coil 397 of empty tray sensor relay 396. Contact 393 of relay 396 is normally in position 395 and is moved to position 391 in response to energization of operating coil 397. It will thus be seen that when the photo-conductive cell 84 is exposed to light from the tube 70 in response to the absence of a bill in the tray 38 as the tray is moved toward or away from its FULL IN position as above described, the grid potential on tube 814 will be greatly increased thereby causing the tube to conduct heavily so that the coil 397 of relay 396 is energized. The cathode of tube 814 is biased by zener diode 816 to assure complete cut-off of the tube whenever the photocell 84 is dark.

A stabilized low voltage is provided for the phototubes K1, K2, photocell L and the channel amplifiers 870, 871 and 920 by zener diodes 820, 822 serially connected with resistor 848 across the B+, B— lines 810, 842 with line 840 being connected at the midpoint between resistors 848 and diode 820 and with midpoint 823 between the diodes 820, 822 being connected to ground 825 and to the B+ line 810 by resistor 824. In the specific embodiment, line 840 will have a voltage of 24 to 30 volts above ground potential while B— line 842 will have a voltage of 24 to 30 volts below ground. A voltage divider comprising resistor 850, potentiometer 852 and resistor 854 serially connected between lines 840 and 842 is used to provide a selectively adjustable anode voltage for the phototube K2, phototube K2 having its cathode connected to B— line 842 and its anode 862 connected to the adjustable tap 856 of potentiometer 852 by resistor 860. Anode 862 of phototube K2 is connected to the control grid of channel amplifier 870 which has its cathode connected to ground and its plate connected to line 840 by plate resistor 872. Photocell L is serially connected between B— line 842 and ground 825 by resistor 873 and potentiometer 869. The adjustable tap of potentiometer 869 is connected to the control grid of channel amplifier 920 which has its cathode connected to ground and its plate connected to line 840 by plate resistor 921. Selectively adjustable anode voltage for the phototube K1 is provided by a voltage divider comprising resistor 875, potentiometer 876 and resistor 877 serially connected between lines 840, 842, the cathode of phototube K1 being connected to the B— line 842 and its anode connected to the adjustable tap on potentiometer 876 by resistor 878. The anode of phototube K1 is similarly connected to the control grid of channel amplifier tube 871 which has its cathode connected to ground and its plate connected to line 840 by plate resistor 879.

The amplified output signals from the phototube K2, photocell L and phototube K1 respectively appearing on the plates of channel amplifier tubes 870, 920 and 871 are respectively applied to the control grids of high and low limit discriminator tubes 900 and 902, 940 and 942, and 943 and 945. More particularly, output circuit 874 of channel amplifier tube 870 is coupled to the control grids of high and low limit discriminator tubes 900, 902 by resistors 904 and 906, the grids of tubes 900, 902 also being connected to ground by capacitors 908, 910; resistor 904 and capacitor 908 form damper 301 while resistor 906 and capacitor 910 form damper 303. While the voltage stabilizing transformer 370 provides substantially constant voltage for the fluorescent tube 70 despite wide swings of line voltage, tube 70 nevertheless has a 120-cycle flicker when 60-cycle line voltage is employed and thus, the output signals of the phototubes K1, K2 and photocell L will have an A.C. component responsive to the flicker of the fluorescent tube 70. It will be seen that the RC filter or integrating circuits 904, 908 and 906, 910 serve to filter out these A.C. components in the output signal from channel amplifier tube 870. In addition, it is desirable to control the speed of response of each pair of discriminator tubes so that the respective high limit relay is energized prior to the respective low limit relay. This is due to the fact that the contacts of the high and low limit relays 330, 332, 334, 336, 338 and 340 which are respectively coupled for energization by the discriminator tubes 900, 902, 940, 942, 943, and 945, are coupled in series, as will be hereinafter more fully described, and the fact that a signal having an amplitude sufficient to energize a respective high limit relay will inherently also energize the respective low limit relay whereas a signal within the predetermined limits will energize the low limit relay without energizing the high limit relay. Thus, it will be seen that if a signal above the predetermined high limit were provided and the respective low limit relay should be energized prior to energization of the respective high limit relay, an erroneous indication of acceptability would momentarily be provided prior to energization of the high limit relay. Thus, the respective RC or integrating circuits for each pair of discriminator tubes 900 and 902, 940 and 942, and 943 and 945 are proportioned to control the response characteristics of the respective discriminator tubes so that the high limit tubes have faster response than the low limit tubes. More particularly, assuming that an output signal is provided in output circuit 874 of channel amplifier tube 870 which is above the predetermined upper limit for that channel, the integrating circuit comprising resistor 904 and capacitor 908 which forms damper 301 and integrating circuit comprising resistor 906 and capacitor 910 which forms damper 303 are relatively proportioned so that the high limit discriminator tube 900 will conduct heavily in response to the output signal in output circuit 874 in advance of the heavy conduction of the low limit discriminator tube 902 in responsive to the same signal.

The high limit for discriminator tube 900, i.e., the amplitude of the output signal from channel amplifier 870 which will drive tube 900 into conduction is selectively adjusted by connection of the cathode of tube 900 to adjustable tap 912 of potentiometer 914 which is serially coupled with resistors 901 and 911 between B+ line 810 and ground. Likewise, the low limit for discriminator tube 902, i.e., the amplitude of the output signal from channel amplifier 870 at which tube 902 will be driven into heavy conduction is selectively adjusted by connection of the cathode of tube 902 to adjustable tap 916 of potentiometer 918 serially connected with resistor 917 between the B+ line 810 and ground, as shown. It will be observed that resistor 911 interconnects potentiometer 914 and ground whereas potentiometer 918 is directly connected to ground, resistor 911 serving to raise the triggering potential of tube 900 above that of tube 902 to provide the high limit.

The output circuit 922 of channel amplifier 920, which amplifies the output signal from the photocell L, is coupled to the control grid of high limit discriminator tube 940 by resistor 932 and to the control grid of low limit discriminator tube 942 by resistor 933, resistor 932 and capacitor 931 forming the integrating circuit or damper 305, and resistor 933 and capacitor 934 forming the integrating circuit or damper 307. Adjustment of the triggering point of the high limit discriminator tube 940 is provided by connection of its cathode to the adjustable tap on potentiometer 944 serially connected with resistor 947 and zener diode 930 between ground and the B+ line 810; zener diode 930 is employed stably to elevate the voltage at which discriminator tubes 940 and 942 will trigger. The triggering potential for the low limit discriminator tube 942 is adjustably set by connection of its cathode to the adjustable tap on potentiometer 946 serially connected with resistor 948 and zener diode 930 across the B+ line 810 and ground.

The coupling of output circuit 950 of channel amplifier tube 871, which amplifies the output signal of the phototube K1, to the high and low limit discriminator tubes 943, 945 is identical to that of output circuit 874 of channel amplifier tube 870 to discriminator tubes 900, 902.

It will now be seen that each of the high level discriminator tubes 900, 940 and 943 will be triggered or driven into heavy conduction by output signals in the respective output circuits 874, 922, 950 which are above predetermined amplitude levels, as established by adjustment by the respective potentiometers 914, 944 and 952, whereas each of the low limit discriminator tubes 902, 942, 945 will be triggered or driven into heavy conduction by output signals exceeding predetermined low limit amplitude levels as established by selective adjustment of potentiometers 918, 946 and 954.

The operating coils of relays 330, 332, 334, 336, 338 and 340 are respectively connected between the plates of discriminator tubes 900, 902, 940, 942, 943 and 945, and line 962 which is connected to the B+ line 810 by the serially connected normally open contacts of bill sensing switch 100 and tray-in switch 106. Thus, it will be seen that plate voltage is not applied to the discriminator tubes 900, 902, 940, 942, 943 and 945 and that none of the operating coils of the high and low limit relays can be energized unless a bill is properly positioned in the tray 38 and the tray is moved to its FULL IN position, thereby closing both of the switches 100, 106. It will be seen that the contacts of high and low limit relays 330, 332, 334, 336, 338 and 340 are connected in series between line 342 and line 398 which is coupled to line 378 and output line 374 from the stabilized power supply 370 by contact 393 of the empty tray sensor relay 396 and its normally closed position 395; the contacts of high limit relays 330, 334 and 338 respectively associated with the high limit discriminator tubes 900, 940 and 943 are normally closed while the contacts of the low limit relays 332, 336, 340 respectively associated with the low limit discriminator tubes 902, 942 and 945 are normally open.

It will now be seen that if a bill is properly positioned in the tray 38 and the tray is completely moved to its FULL IN position, the contacts of switches 100, 106 will be closed thus applying plate potential to the discriminator tubes, and the bill in the tray will be shielding photocell 84 from the fluorescent tube 70 so that operating coil 397 of the empty tray sensor relay 396 will be de-energized and contact 393 thus will be in its normally closed position 395 applying potential to the line 398. Under these conditions, if the amplitudes of the signals from each of the phototubes K1, K2 and the photocell L are within predetermined limits, thus indicating that the spectral content of the light reflected from each of the discrete areas of the bill B exposed by the apertures C, D, and E and the cover 40 conform to that of a genuine acceptable bill, each of the low limit discriminator tubes 902, 942 and 945 will be driven into conduction thus energizing the operating coils of the low limit relays 332, 336 and 340 to close their respective contacts, whereas each of the high limit discriminator tubes 900, 940 and 943 will remain cut-off so that the operating coils of the respective high limit relays 330, 334 and 338 will not be energized and their respective contacts will remain in their normally closed positions.

Under this condition, i.e., the detection of an acceptable bill, the contacts of the high and low limit relays 330, 332, 334, 336, 338 and 340 establish a series circuit connecting line 398 to line 342 and applying potential thereto. Thus, an indicating voltage or signal is applied to line 342 in response to detection of an acceptable bill. It will be seen, however, that if the amplitude of the signal provided by any one of the phototubes K1, K2 or the photocell L is below the respective lower limit thus indicating that the spectral content of the light reflected from the respective area of the bill being inspected does not conform to that of an acceptable bill, one of the low limit discriminator tubes 902, 942, 945 will remain cut-off so that the operating coil of the respective low limit relay 332, 336, or 340 will not be energized with the result that the respective contact will remain in its normally open position so that the line 398 will not be connected to the line 342 and no acceptable bill-indicating signal will be provided. Likewise, if the amplitude of the signal from any one of the phototubes K1, K2 or the photocell L is above the respective predetermined upper limit, thus again indicating that the spectral content of the light reflected from the respective area of the bill does not conform to that of an acceptable bill, one of the high limit discriminator tubes 900, 940, 943 will be driven into conduction thus energizing the operating coil of the respective high limit relay 330, 334, or 338 to open its contacts, again preventing connection of line 398 to line 342 so that no indicating signal is provided.

It will now be seen that detection of an acceptable bill by the detection and discrimination system above-described will result in the provision of an indicating signal in line 342 which can be employed for actuating other apparatus, such as a vending machine, coin changing apparatus, or some combination thereof. In the illustrated embodiment, the indicating signal in line 342 is employed to actuate the bill grabber assembly 120 to remove the detected acceptable bill from the tray 38 and to deposit it in container 125, removal of the acceptable bill from the tray being detected by the empty tray sensing system F and the resulting signal employed to actuate conventional coin changing apparatus (not shown).

In the circuit illustrated in FIG. 17, the indicating signal line 342 is connected to one side of ON coil 349 of latching relay 350, the other side of coil 349 being connected to line 394 which in turn is connected to output line 372 of the stabilized power supply 370. Thus, it will be seen that with contact 393 of the empty tray sensor relay 396 in its position 395 responsive to the presence of a bill in the tray 38 and with the contacts of the high and low limit relays establishing a series circuit connecting line 398 to line 342 as above-described ON coil 349 is coupled across output lines 372, 374 from the stabilized power supply 370 and energized thereby. It will be understood that momentary energization of ON coil 349 and latching relay 350 will result in picking up and latching of its contacts which will thereafter remain in the picked-up position until subsequent energization of the UNLATCH coil 590 as will be hereinafter described.

Latching relay 350 is provided with normally open contacts 352 connecting line 366 of the unregulated power supply to line 360 which is connected to one side of the grabber solenoid 130, the other side of which is connected to the other line 364 of the unregulated power supply. Thus, when ON coil 349 of the latching relay 350 is energized as above described, in response to detection of an acceptable bill, contacts 352 will be closed thus coupling the grabber solenoid coil 130 across lines 364, 366 for energization.

Referring now to FIGS. 5, 10 and 11, it will be seen that the pairs of grabber jaws 122, 124 are respectively in alignment with the slots 52, 54 in the rear edge of cover 40 and tray 38, and that when the tray 38 with bill B properly positioned therein is in its FULL IN position within housing 30, the rear edge A of the bill B exposed by the slots 52, 54 extends between the grabber jaws, as best seen in FIG. 10. Thus, energization of the grabber solenoid 130, as above described, will actuate the movable grabber jaws 122 so as to clamp the exposed portions of the edge A of the bill B, as best seen in FIG. 11; it will be observed that grabber solenoid 130 will remain energized and thus that the grabber jaws will remain in clamping engagement with the bill B until energization of the UNLATCH coil 590 of the latching relay 350.

Referring now to FIGS. 12, 13 and 14 in addition to FIG. 17 it will be seen that when the tray 38 is moved outwardly toward its FULL OUT position, bill B is retained by the grabber assembly 120 and withdrawn from tray 38 and cover 40. As the outward movement of tray 38 proceeds with bill B being simultaneously withdrawn therefrom, aperture C' will be uncovered and together with aperture C in cover 40 will expose light source 70 to photocell 84 to excite the same, drive tube 814 into conduction, energize operating coil 397 of the empty tray sensor 396, and move contact 393 from its position 395 to its position 391.

In order to unlatch relay 350 in response to the above described detection of removal of the bill B of the tray 38 thereby to de-energize the grabber solenoid 130 and to release the bill B so that is is deposited in the receptacle 125, and also to energize the coin changing mechanism, the arrangement now to be described is provided. Another latching relay 402 is provided having an ON coil 392 and an UNLATCH coil 592. Latching relay 350 has normally open contacts 356 which when relay 350 is picked-up, connect line 390 to one side of the ON coil 392, the other side of coil 392 being connected to line 394 and to output line 372 of the stabilized power supply 370. Thus it will be seen that with contact 356 of relay 350 closed in response to detection of an acceptable bill and the contact 393 of the empty tray sensor relay 396 moved to its position 391 in response to detection of removal of the bill from the tray 38, the ON coil 392 of the latching relay 402 is connected across output lines 372, 374 of the stabilized power supply 370 and thus energized to close and latch normally open contact 410; contact 410 will remain latched closed until energization of the UNLATCH coil 592 of latching relay 402 despite the fact that energization of operating coil 397 of the empty tray sensor relay 396 occurs only momentarily as the tray 38 is moved toward and into its FULL OUT position in which member 60 shields photocell 84 from tube 70.

Referring additionally to FIG. 14, when the tray 38 reaches its FULL OUT position, switch 381 will be actuated thus closing its normally open contacts 380, 412. Latching relay 350 is provided with contacts 354 which are in position 600 when the relay is dropped out, i.e., unlatched, and position 355 when the relay is picked-up, i.e., latched. Contacts 380 of tray-out switch 381 when both are closed, as above described, connect one side of the operating coil of relay 384 to line 376 which in turn is connected in line 378 and output line 374 from the regulated power supply 370. The other side of the coil of relay 384 is connected to line 524 which in turn is connected to line 394 and to the other output line 372 of the stabilized power supply 370. Thus, closing of contacts 354, of latching relay 350 and contacts 380 of tray-out switch 381 will connect the coil of relay 384 across output lines 372, 374 of stabilized power supply 370 and the resultant energization of the coil of relay 384 will close its normally open contacts 382, 386; closing of contacts 382 will seal-in the coil of relay 384 despite subsequent manipulation of the tray 338 which would result in tray-out switch 381 opening its contacts 380.

Closing of contacts 412 of the tray-out switch 381 and closing of contacts 410 of latching relay 402 serially connect line 522 to line 523 which in turn is connected to line 366 of the unregulated power supply. Line 522 is in turn connected to the contacts 500 of time delay relay U which are in position 550 when the operating coil W of relay U is not energized. Contacts 500 when in position 550 connect line 522 to line 552 which is connected to one side of the coin changing apparatus (not shown) the other side of which is connected to line 362 which in turn is connected to the other line 364 of the unregulated power supply. Closing of contacts 386 of the relay 384, as above-described, seals-in the connection of line 522 despite subsequent manipulation of the tray 38 which may cause opening of contacts 412 of the tray-out switch 381.

In the specific application for the system thus far illustrated and described, a conventional two-pulse coin changing device is employed which is required to be actuated twice in order to dispense the requisite change for a one dollar bill and thus it is required that two successive pulses be applied to the coin changing apparatus. It will be seen that closing of contacts 412 of the tray-out switch 381, accompanied by closing of the contacts 386 of relay 384, and closing of contacts 410 of latching relay 402 connect the coin changing apparatus across lines 364, 366 of the unregulated power supply thus providing the first of the two pulses.

It will be observed that the operating coil W of time delay relay U is coupled in parallel with the coil of relay 384 and thus will be simultaneously energized, however, time delay relay U is of the type providing a time delay on pick-up and thus its contacts 500, 502 will not be actuated or picked-up for a predetermined time delay after energization of the operating coil W. When the contacts 500, 502 are picked-up, contact 500 moves to its position 556 thus breaking the connection of line 522 to line 552 to de-energize the coin changing apparatus thus terminating the first actuating pulse. Contact 502 of time delay relay U is normally open and when picked-up, closes to position 558 connecting operating coil X of time delay relay T in parallel with operating coil W and the operating coil of relay 384. Time delay relay T is likewise of the type providing a predetermined time delay on pick-up so that its normally open contacts 504, 506 will remain open for a predetermined time delay following energization of operating coil X. When contacts 504 and 506 close following the predetermined time delay relay, line 522 is now again connected to the coin changing mechanism through contacts 500 of time delay relay U in position 556, contacts 504 of time delay relay T in position 570 and contacts 508 of time delay relay S in position 509, thus initiating the second actuating pulse for the change making apparatus.

Closing of contacts 506 of time delay relay T connects operating coil Y of time delay relay S in parallel with operating coils X and W of time delay relays T and U and the operating coil of relay 384, and operating coil Y will thus be energized. Time delay relay S is also the type providing a predetermined time delay on pick-up and thus its contacts 508 and 510 will not be picked-up until expiration of the predetermined time delay following energization of operating coil Y. When the contacts 508, 510 of time delay relay S are picked-up after the time delay, contact 508 moves to its open position 580 thus again breaking the connection of line 522 to the coin changing apparatus to de-energize the same and thus to terminate the second actuating pulse. Closing of the normally open contact 510 of the time delay relay S connects line 584 to lines 376, 378 and the output line 374 of the stabilized power supply 370 through the now-closed contacts 510, 506 and 502 of the time delay relays S, T, and U, contact 380 of tray-out switch 381 and/or contact 382 of relay 384, and contact 354 of latching relay 350 in its latched closed position 355. Line 584 is connected to one side of the UNLATCH coil 590 of latching relay 350, the other side of UNLATCH coil 590 being connected to line 394 and in turn to the other output line 372 of the stabilized power supply 370. Thus, closing of contact 510 of the time delay relay S, as above described, couples the UNLATCH coil 590 of latching relay 350 across output lines 372, 374 of the stabilized power supply 370 and UNLATCH coil 590 is thus energized to unlatch and drop out latching relay 350.

Unlatching of latching relay 350 opens its normally open contacts 352 to de-energize the grabber solenoid 130 thus in turn causing opening of the movable grabber jaws 122 under the influence of the spring 160 so as to release the bill B and to permit it to fall into the container 125, as best seen in FIG. 14.

Movement of contact 354 of the latching relay 350 to its dropped-out or unlatched position 600 breaks the connection to the operating coil of relay 384 and to operating coils W, X and Y of time delay relays U, T and S thus de-energizing those coils. The resultant opening of contact 510 of time delay relay S breaks the connection to the UNLATCH coil 590 of the latching relay 350 thus de-energizing that coil. Movement of contact 354 of latching relay 350 to its dropped-out or unlatched position 600 connects the UNLATCH coil 592 of latching relay 402 to line 378 and in turn to output line 374 of the stabilized power supply 370, the other side of UN-LATCH coil 592 being connected to line 394 and the other line 372 from the power supply 370 thus energizing UNLATCH coil 592 to unlatch relay 402 and to open its contact 410 to break the connection to line 522 and in turn to the coin changing mechanism.

It will thus be seen that detection of an acceptable bill by the spectral analysis and discrimination circuitry above described results in clamping of the bill by the grabber assembly 120 and that detection of removal of the acceptable bill from the tray 38 results in actuation of the coin changing mechanism, release of the bill and finally in restoration of the pay-out circuitry to its initial condition to permit inspection of another bill; it will be readily seen that the detection and discrimination operation is accomplished virtually instantaneously upon presentation of a bill for inspection, and that the pay-out operation is accomplished very quickly following detection of an acceptable bill, the entire detection and pay-out operation requiring on the order of two or three seconds.

Figure 15:
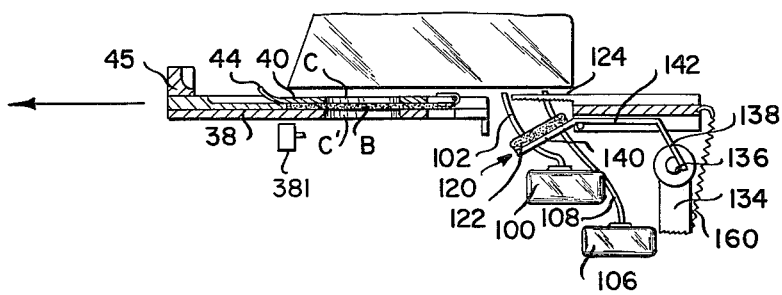
FIG. 15 is a view similar to FIG. 12, illustrating the relationship of the parts when a non-acceptable bill has been presented to the device.

Referring now to FIG. 15, there is shown the condition which will prevail upon withdrawal of the tray 38 following rejection of the bill, i.e., the failure of the detection and discrimination circuitry to detect an acceptable bill, or that which will prevail upon an effort to pilfer an acceptable bill following detection. As above-described, if as a result of the spectral analysis of the light respectively reflected from the discrete areas of the bill exposed by the apertures C, D, and E in the cover 40, the spectral content of the light reflected from one or more of these areas results in a signal having an amplitude below or above the predetermined limits for the respective high and low limit discriminator channel, the contacts of at least one of the high and low limit relays will be open with the result that no indicating signal will be provided in line 342; thus ON coil 349 of the latching relay 350 will not be energized and therefore contacts 352 will not be closed so that the driver solenoid 130 will not be energized. Under this condition, the grabber jaws 120 will remain in their open positions as shown in FIG. 15 and the bill B will thus remain in the tray 38 as it is moved outwardly to its retracted position. The failure of the latching relay 350 to pick-up will likewise prevent energization of the operating coils W, X, and Y of time delay relays U, T and S and of relay 384 since contact 354 of latching relay 350 will not be moved to its position 355. Furthermore, since the bill B is thus not removed from the tray 38, photocell 84 will not be exposed to the light from tube 70, operating coil 397 of the empty tray sensor 396 will not be energized so that its contact 393 will not be moved to its position 391, and the ON coil 392 of latching relay 402 will thus not be energized despite closing of contact 356 of relay 350, with the result that contact 410 of relay 402 will not close thus preventing energization of the coin changing mechanism.

Assuming now, however, that an acceptable bill is presented for inspection and accepted by the detection and discrimination circuitry resulting in the provision of an indicating signal in line 342 and in turn in energization of the grabber solenoid 130 so that the grabber jaw assembly 120 is actuated to engage bill B, but that an effort to pilfer the detected bill is made with the result that the bill remains in the tray 38 and is pulled away from the grabber jaws 120 as the tray is moved outwardly. Under this condition, with the bill remaining in the tray 38 and thus covering aperture C' therein, photocell 84 will not be exposed to the light from the tube 70 so that operating coil 397 of the empty tray sensor 396 will not be energized and its contact 393 will not move to its position 391. Thus, the ON coil 392 of the latching relay 402 will not be energized, its contact 410 will not be closed, and thus potential will not be applied to line 522 to energize the coin changing mechanism. With the latching relay 350 picked-up, however, as a result of the provision of an indicating signal on line 342, the operating coil of relay 384 and operating coils W, X, and Y of time delay relays U, T, and S will be successively energized when the tray reaches its FULL OUT position to close switch 381 as above-described, finally resulting in closing of contacts 510 of time delay relay S to energize the UNLATCH coil 590 of unlatching relay 350 thus dropping-out relay 350 to restore the pay-out circuitry to its original condition, as above described.

Referring now to FIG. 19 in which like elements are indicated by like reference numerals, there is shown the preferred embodiment of the pay-out portion of the invention, it being understood that with the noted exception of the location of the contacts of the switch 100, the detecting and discriminating portions of the circuit are substantially identical to that shown in FIG. 17.

Here, the acceptable bill-indicating signal line 342 is connected to one side of the operating coil 600 of relay 602, coil 600 having its other side connected to line 394 which in turn is connected to output line 372 from the stabilized power supply 370. Thus, when an acceptable bill has been detected resulting in the provision of an indicating signal line in line 342, coil 600 is energized. Relay 602 is provided with sealing contacts 604 serially connected with unlatch contacts 606 of timing motor 608, contacts 604, 606 sealing-in operating coil 600 of relay 602 to lines 376, 378 and the other output line 374 of the stabilized power supply 370 when coil 600 of relay 602 is energized and timing motor 608 is in its index position.

Relay 602 is provided with contacts 610 which are moved from position 612 to position 614 in response to energization of operating coil 600. Contacts 610 in position 614 connect the grabber solenoid 130 for energization across lines 364, 366 of the unregulated power supply.

In this embodiment, only the contacts of the tray-in switch 106 are connected in series with the line 810, the contacts of the bill-detecting switch 100 being connected in series between photocell 84 and resistor 804. Here, the contacts of switch 100 are normally open as in the embodiment of FIG. 17, and are closed in response to proper positioning of the bill in the tray 38 and movement of the tray to its FULL IN position. This arrangement is provided in order positively to disable photocell 84 until the bill is presented for inspection. However, it will be seen that as soon as the tray 38 with a bill therein is moved away from its FULL IN position, the contacts of switch 100 will again open, thus disabling the circuit of photocell 84 and resistor 804. However, if a properly aligned acceptable bill has been left gripped by the grabber jaws, switch contacts 100 will remain closed thus enabling photocell 84 to sense the absence of a bill from the tray as above-described.

Timing motor 608 is connected between lines 362 and position 614 of contacts 610 of relay 602 by normally open contacts 616 of the tray-out switch 381. Thus, when an acceptable bill has been detected resulting in picking-up of relay 602 to move contacts 610 to position 614 and when the tray 38 has been returned to its FULL OUT position, thus closing contacts 616, timing motor 608 will be energized to initiate the pay-out cycle. Timing motor 608 is provided with and actuates unlatch contacts 606, index contacts 618, and two vend switches 620 and 622. Index contact 618 is closed as soon as the motor 608 is energized, and remains closed during the pay-out cycle, being opened at the end of the cycle to de-energize and thus stop the motor 608. Unlatch contacts 606 remain closed during the cycle, being momentarily opened close to the end thereof in order to de-energize operating coil 600 of relay 602, as will be hereinafter described. Vend switch contacts 620, 622 are sequentially operated during the pay-out cycle to provide the requisite two actuating pulses for the coin changing mechanism, as will be hereinafter more fully described.

It will be recalled that detection of the removal of a bill from the tray 38 by the photocell 84 resulted in energization of operating coil 397 of the empty tray sensor relay 396 which moved its contact 393 from position 395 to position 391. Line 390 connected to position 391 of contacts 393 is connected to one end of operating coil 624 of relay 626, the other end of coil 624 being connected to line 394 which in turn is connected to output line 372 of the stabilized power supply 370. Thus, when contacts 393 of the empty tray sensor 396 are moved to position 391 in response to detection of removal of a bill from the tray 38 by the grabber jaws 120, operating coil 624 of relay 626 will be energized closing its normally open contacts 628 and 630. Contacts 628 of relay 626 are serially connected with contacts 632 of relay 602 and seal-in operating coil 624 of relay 626 to lines 376, 378 and output line 374 of the stabilized power supply 370. Contacts 630 in their closed position connect line 634 to line 523 which is connected to line 366 of the unregulated power supply, the vend contacts 620, 622 of the timing motor 608 respectively connecting line 634 to line 552 which is connected to one side of the coin changing mechanism, the other side being connected to line 362 which in turn is connected to the other input line 364 of the unregulated power supply. A manually actuated vend select switch 636 is provided for selectively connecting vend switch contacts 620 in the circuit; if only a single actuating pulse is required for the change-making apparatus in order to dispense the desired change, then select switch 636 is opened thus disconnecting vend switch contacts 620 from the circuit so that only vend contact 622 are effective to provide a single actuating pulse. On the other hand, if two sequential pulses are required, then switch 636 is closed thereby connecting vend contacts 620 in the circuit.

Assuming now than an acceptable bill has been detected, it will be seen that operating coil 600 of relay 602 will be energized thereby picking-up its contacts 604, 610 and 632 resulting in energization of the grabber solenoid 130 and energization of timing motor 608 as above described. Assuming further that removal of the bill from the tray 38 has been detected by the photocell 84, operating coil 624 of relay 626 will be energized closing its contacts 630. Thereafter, assuming that vend switch 636 is closed, timing motor 608 will close vend switch contacts 620 for a predetermined period of time to provide the first actuating pulse for the change making apparatus, vend switch contacts 620 then being opened to terminate the first pulse and vend switch contacts 622 thereafter being sequentially closed and opened to provide the second pulse; it will be readily seen that if the vend select switch 636 is opened, only a single actuating pulse will be provided by closing of the vend switch contacts 622. Close to the end of the pay-out cycle, unlatch contacts 606 will be opened thus de-energizing operating coil 600 of relay 602 to drop-out its contacts. Opening of sealing contacts 632 of relay 602 will break the sealing circuit of operating coil 624 of relay 626 thus de-energizing that coil and dropping out relay 626. However, it will be observed that dropping-out of relay 602 moved its contacts 610 to its position 612 so that motor 608 remains energized through index contacts 618 in order to complete the pay-out cycle, index contacts 618 being actuated to the open position at the end of the cycle to de-energize timing motor 608.

It will be seen that if the bill presented for inspection is not detected as being acceptable, no indicating signal will be provided in line 342 and thus operating coil 600 of relay 602 will not be energized to which event timing motor 608 cannot be energized so that the pay-out cycle is not initiated; neither of the vend of switches 620, 622 will be actuated and thus the coin changing mechanism will not be actuated.

It will further be seen that if an acceptable bill has been detected but a successful effort is made to pilfer the bill after detection, operating coil 397 of empty tray sensor relay 396 will not be energized and thus its contacts 393 will not be moved to position 391 so that operating coil 624 of relay 626 will not be energized. With relay 626 thus remaining in its dropped-out position, its contacts 630 will not be closed, thus preventing the application of potential to line 552 and the coin changing mechanism despite operation of the timing motor 608 through a pay-out cycle.

In a specific embodiment of the apparatus of FIG. 19 in which a yellow-orange filter was employed in conjunction with photocell K2 as above described, the following component values were employed:

| | |
|---|---|
| Diode 377 | 1N2070. |
| Resistor 373 | 150 ohms. |
| Photocell 84 | CL403. |
| Capacitor 375 | 300 mfd. |
| Resistor 804 | 33K. |
| Tube 814 | 6AU6. |
| Diode 816 | 1N513. |
| Resistor 824 | 8.2K. |
| Resistor 848 | 1.8K. |
| Diode 820 | 1N1517. |
| Diode 822 | 1N1598. |
| Resistor 850 | 12K. |
| Potentiometer 852 | 2K. |
| Thermistor 851 | 650 ohms. |
| Resistor 854 | 8.2K |
| Resistor 860 | 30 meg. |
| Phototube K2 | 1P39. |
| Resistor 873 | 2.35K. |
| Potentiometer 869 | 5K. |
| Photocell L | CL505. |
| Thermistor 853 | 4000 ohms. |
| Resistor 875 | 12K. |
| Potentiometer 876 | 2K. |
| Thermistor 855 | 500 ohms. |
| Resistor 877 | 8.2K. |
| Resistor 878 | 30 meg. |
| Phototube K1 | 1P39. |
| Fluorescent tube 70 | F6T5/CW. |
| Tubes 870, 871, 920 | 12BL6. |
| Capacitor 865 | .0005 mfd. |
| Resistors 872, 879, 921 | 27K. |
| Capacitor 867 | .001 mfd. |
| Tubes 900, 902, 940, 942, 943, 945 | 6AU6. |
| Resistors 901, 917, 947, 948, 958, 961 | 22K. |
| Resistor 904 | 470K. |
| Capacitor 908 | .005 mfd. |
| Potentiometer 914 | 2K. |
| Resistor 911 | 560 ohms. |
| Resistor 905 | 820K. |
| Capacitor 910 | .0068 mfd. |
| Potentiometer 918 | 2K. |
| Resistor 932 | 1.0 meg. |
| Capacitor 931 | .003 mfd. |
| Potentiometer 944 | 5K. |
| Resistor 933 | 1.0 meg. |
| Capacitor 934 | .02 mfd. |
| Potentiometer 946 | 2K. |
| Diode 930 | 1N1513. |
| Resistor 955 | 470K. |
| Capacitor 956 | .005 mfd. |
| Potentiometer 952 | 2K. |
| Resistor 957 | 560 ohms. |
| Resistor 959 | 820K. |
| Capacitor 960 | .05 mfd. |
| Potentiometer 954 | 2K. |

It will now be understood that in the embodiment of the invention described and illustrated intended for discriminating between acceptable one dollar United States currency and unacceptable currency by spectral analysis of the light reflected from the side of an acceptable bill which is printed in green, the cool white or daylight fluorescent lamp employed for the light source 70 provides spectral emission over a band of wavelengths from near ultra-violet to far red or near infrared, there being substantial emission in the blue to near ultraviolet section of the band and appreciable emission at the far red end of the band. Thus, sufficient emission energy is available to provide output signals of adequate amplitude from the photo-sensitive devices in the color sections of the band of wavelengths emitted by the light source corresponding to the color sections or components of interest in the document being inspected, i.e., blue to near ultra-violet and green in the case of a United States one dollar bill (it being recalled that blue is a color component of the green pigmented ink). It will further be observed that sufficient emission energy is available in the color section of the band of wavelengths emitted by the light source to provide an output signal of adequate amplitude from a photo-sensitive device in response to a color component of an unacceptable document, i.e., the yellow-orange color component of the Mexican peso in the case of the embodiment described and illustrated. It will be readily seen that when the device of the invention is employed for discriminating between acceptable and unacceptable foreign currency or other documents having different color components of interest, a different light source having a different spectral emission may be provided in order that sufficient emission energy be available in the color sections of interest on the acceptable and unacceptable documents to be inspected. Thus, if the acceptable currency to be inspected is that of a foreign country in which yellow is the predominant printing color, a light source providing greater emission energy in the yellow section of the band would desirably be provided rather than the fluorescent tube employed as a light source in the embodiment described.

It will be understood that the spectral content of the light reflected from the surface of the document being inspected will be modified from the spectral content of the light source by the spectral characteristics of the reflective surface, i.e., some of the color sections of the incident light will be attenuated more than some other color sections. However, while a particular color section contained in the band of wavelengths emitted by the source may not necessarily be present in the reflected light, the reflected light cannot contain any color section which is not initially present in the band of wavelengths emitted by the source.

Referring now to FIG. 20, there is shown diagrammatically and in enlarged form one of the discrete areas 650 of the bill B exposed by the apertures C, D, and E from which light is reflected from the source 70 to the respective photo-sensitive device. It will be seen that the printing on the green side of the bill within the discrete area 650 is defined by discrete lines 651 printed upon the background color 652, the lines 651 being spaced apart as at 653. It will now be seen that each of these characteristics, i.e., the background color 652, the color of the ink with which lines 651 are printed and the spacing 653 between the lines contributes its own spectral characteristic to the overall spectral content of the light reflected from the discrete area 650, i.e., the spectral content of the reflected light depends upon the spectral characteristics of the background color, the pigment color of the ink, and the mechanical characteristics of the spacing of the lines. Thus, all three of these characteristics must be correct in order to provide the correct spectral content in the reflected light, i.e., correct ink and correct engraving with incorrect background color will not provide the correct spectral content in the reflected light, correct background color and correct engraving with incorrect ink will not provide the correct spectral content in the reflective light, etc.

It will finally be seen that the spectral response of the photosensitive devices must be correlated with the spectral emission of the light source and the spectral characteristics of the light reflected from the discrete areas of the surface of the documents selected for inspection. Thus, in the embodiment illustrated and described, the phototubes K have maximum sensitivity in the blue to violet section of light while the photocell L has maximum sensitivity in the green section of light. Referring now to FIG. 21, the sensitivity curve for the 1P39 phototube is shown by the solid line 654 while the sensitivity curve for the CL505 photocell is shown by the dashed line 656; the sensitivity curves shown in FIG. 21 are obtained with a broad band light source having uniform emission across the light spectrum. It will now be readily seen that if other color sections in the reflected light from the discrete areas of the document being inspected are of greater interest, as in the case of foreign currency in which the predominant color is yellow for instance, other photosensitive devices having maximum sensitivity to the color sections of interest will be employed for optimum discrimination.

Referring now to FIG. 22, in which the sensitivity curve of the 1P39 phototube calibrated with a broad band source is again shown by the solid line 654, it will be understood that photosensitive devices of both the photoemissive and photoconductive varieties integrate the emission energy and thus provide an output signal, the amplitude of which is principally a function of the area under the spectral response curve. Thus, with a broadband light source of given intensity, a photosensitive device having a sensitivity curve as shown at 654 in FIG. 22 when calibrated with such a broadband source would provide an output signal having an amplitude as shown at 655. However, impingement of light having a different spectral content upon the photosensitive device of FIG. 22 will provide a different response sensitivity characteristic and thus a light source having a high ultra-violet content would provide a response characteristic as shown by the dashed line 657 and a resultant output signal having an amplitude as shown at 658 and a light source having high emission energy in the blue section of the spectrum would provide a response curve as shown by the dashed line 659 and a resultant output signal amplitude as shown at 670. It will further be observed from the broad band sensitivity curve 654 that some emission energy in the yellow-to-red section is detected by a photosensitive device having the broadband characteristics 654, and thus that incident light having emission energy principally in the yellow section of the band will provide a response characteristic as shown by the dashed line 671 and an output signal amplitude as shown at 672. Thus, it is seen that the provision of the yellow-orange filter in connection with the phototube K2 will provide in the case of a bill presented for inspection which has a high yellow-to-red characteristic in its reflective surface, as in the case of the Mexican peso, an output signal of sufficient amplitude to provide, when suitably amplified, a high limit rejection signal, i.e., to drive the high limit discriminator tube 943 into conduction in the illustrated embodiment.

As previously indicated, in the case of the embodiment illustrated and described, it has been found that optimum discrimination is provided in the case of one dollar United States currency by providing photosensitive devices having maximum sensitivity in the blue-to-ultra-violet section and in the green section, respectively, of the reflected light, these sections corresponding to predominant color components on the surface of the acceptable currency, i.e., blue and green. In the case of foreign currency or other documents, it will be readily understood that photosensitive devices have a maximum sensitivity to other color sections, such as yellow and red, would be provided in order to provide the requisite discrimination. It will further be understood that in order affirmatively to reject unacceptable currency or other unacceptable documents having known color characteristics, one of the photosensitive devices may be arranged to have maximum sensitivity, either by selection of the appropriate device or by the provision of an appropriate filter, to a color component of the unacceptable currency or other document.

Referring now to FIG. 23, the discrete areas of the surface of the document from which light is reflected may be defined by means of appropriate shields 680 associated with the respective photosensitive devices 682 rather than by means of the apertures C, D, and E in the cover 40 of the previous embodiment. Thus, the light from the source 70 will illuminate an enlarged area 684 of the surface 686 of the document being inspected, as indicated by the dashed lines 688, while the shield 680 associated with the photosensitive device 682 will define a discrete small area field of view for the device 682, as indicated by the dashed lines 690, thereby providing the discrete areas 692, the reflected light from which is received by the photosensitive device 682.

In the embodiment illustrated and described, it will be understood that the high limit discriminator tubes 900, 940 are tuned to accept a new genuine one dollar United States bill, i.e., so that they are not driven into conduction by a new genuine bill, whereas the low limit discriminator tubes 902, 942 are tuned to accept a genuine old one dollar United States bill, i.e., so that they are driven into conduction by such a bill, the high and low limit discriminator tubes 900, 902, 940, 942 being further tuned affirmatively to reject known counterfeit currency, either by causing one or the other or both of the high limit discriminator tubes 900, 940 to be driven into conduction, or so that one or the other or both of the low limit discriminator tubes 902, 942 are not driven into conduction. In the case of the high and low limit discriminator tubes 943, 945 which respond to the amplitude of the output signal from the phototube K2 with which the yellow-orange filter is associated, the high limit discriminator tube 943 is tuned specifically to reject the Mexican peso so that it is driven into conduction when a Mexican peso is presented but remains cut-off when acceptable currency is presented; low limit discriminator tube 945 is driven into conduction by both acceptable currency and the peso. It will further be observed that the printing upon the green side of other denominations of United States currency differs from that on a one dollar bill and thus the spectral content of light reflected from the same areas of other denominations of United States currency will differ from that reflected from the genuine one dollar bill so that genuine United States currency of other denominations will be rejected. However, the discriminator circuits of the embodiment illustrated and described may be tuned to accept any particular denomination of United States currency, such as a five dollar bill or a ten dollar bill, and to reject other denominations along with counterfeit currency and foreign currency in the same manner as above described in connection with one dollar United States currency. It will also be seen that in areas in which foreign currency other than the Mexican peso is prevalent, an appropriate color filter may be substituted for the yellow-orange filter in order affirmatively to reject such foreign currency.

While there have been described above the principles of this invention in connection with specific apparatus, it is to be clearly understood that this description is made only by way of example and not as a limitation to the scope of the invention.

What is claimed is:

1. The method of discriminating between desired and undesired documents by spectral analysis of light reflected therefrom comprising the steps of: emitting visible light in a plurality of color sections including respective color components existing on one surface of a desired document; exposing said one surface of a document to be inspected to said light while holding said document stationary with respect thereto, and reflecting said light from said one surface; receiving at a plurality of locations light respectively reflected from a plurality of preselected spaced-apart discrete areas of said one surface, said areas being relatively small compared with the total area of said one surface; developing a plurality of electrical signals having amplitudes respectively responsive to the spectral content of said light received from said discrete areas; and utilizing each of said signals to develop an indicating signal when the spectral content of each of said areas conforms to that of a desired document.

2. The method of discriminating between desired and undesired documents by spectral analysis of light reflected therefrom comprising the steps of: providing a source of visible light having spectral emission over a band of wavelengths including those of the color components of one surface of a desired document and at least one color component of an undesired document; directing light from said source onto said one surface of a document to be inspected while holding said document stationary with respect to said source and reflecting said light from said surface; simultaneously receiving at a plurality of locations light respectively reflected from a plurality of preselected discrete areas of said one surface; developing a plurality of electrical signals having amplitudes respectively responsive to the spectral content of said light received from said discrete areas; each of said signals having a maximum amplitude in response to a color section included in said band of wavelengths, at least one of said signals having a maximum amplitude in response to one of said color components of a desired document, at least one other of said signals having a maximum amplitude in response to said color component of an undesired document; and simultaneously utilizing each of said signals to develop an indicating signal when the spectral content of each of said areas conforms to that of a desired document.

3. The method of discriminating between desired and undesired documents by spectral analysis of light reflected therefrom comprising the steps of: providing a source of visible light having spectral emission over a band of wavelengths including those of the color components of one surface of a desired document and at least one color component of an undesired document; directing light from said source onto said one surface of a document to be inspected while holding said document stationary with respect to said source and reflecting said light from said surface; simultaneously receiving at a plurality of locations light respectively reflected from a plurality of preselected discrete areas of said one surface; developing a plurality of electrical signals having amplitudes respectively responsive to the spectral content of said light received from said discrete areas; each of said signals having a maximum amplitude in response to a color section included in said band of wavelengths, at least one of said signals having a maximum amplitude in response to one of said color components of a desired document, at least one other of said signals having a maximum amplitude in response to another one of said color components of a desired document, at least a further one of said signals having a maximum amplitude in response to said color component of an undesired document; and simultaneously utilizing each of said signals to develop an indicating signal when the spectral content of each of said areas conforms to that of a desired document.

4. The method of discriminating between desired paper currency having one surface thereof printed in green and undesired paper currency by spectral analysis of light reflected therefrom comprising the steps of: providing a source of visible light having spectral emission over a band of wavelengths with substantial emission in the section including blue and near ultraviolet; directing light from said source onto said one surface of a piece of currency to be inspected while holding said piece stationary with respect to said source and reflecting said light from said source; simultaneously receiving at a plurality of locations light respectively reflected from a plurality of preselected discrete areas of said one surface; developing a plurality of electrical signals having amplitudes respectively responsive to the spectral content of said light received from said discrete areas, each of said signals having a maximum amplitude in response to a color section included in said band of wavelengths, at least one of said signals having a maximum amplitude in response to the blue to near ultraviolet section of said reflected light, at least one other of said signals having a maximum amplitude in response to the green section of said reflected light; simultaneously detecting the amplitudes of each of said signals to determine whether said signals are respectively within predetermined lower and upper limits, said upper limits being predetermined from a new piece of desired currency and said lower limits being predetermined from an old piece of desired currency; and developing an indicating signal in response to each of said first-named signals being within said limits.

5. The method of discriminating between desired and undesired documents by spectral analysis of light reflected therefrom comprising the steps of: emitting visible light in a plurality of color sections including respective color components existing on one surface of a desired document; exposing one surface of a document to be inspected to said light while holding said document stationary with respect thereto and reflecting said light from said one surface; defining a plurality of preselected spaced-apart discrete areas on said one surface, said areas being respectively relatively small compared with the total area of said one surface; receiving at a plurality of locations light respectively reflected from said discrete areas; developing a plurality of electrical signals having amplitudes respectivly responsive to the spectral content of said light received from said discrete areas, and utilizing each of said signals to develop an indicating signal when the spectral content of each said areas conforms to that of a desired document.

6. The method of discriminating between desired and undesired documents by spectral analysis of light reflected therefrom comprising the steps of: emitting visible light in a plurality of color sections including respective color components existing on one surface of a desired document; directing said light onto said one surface of a document to be inspected while holding said document stationary with respect thereto and reflecting said light from said surface; defining a plurality of preselected spaced-apart discrete areas on said one surface, said discrete areas being respectively relatively small compared with the total area of said one surface; receiving at a plurality of locations light respectively reflected from said discrete areas; developing a plurality of electrical signals having amplitudes respectively responsive to the spectral content of said light received from said discrete areas; detecting the amplitudes of each of such signals to determine whether such signals are respectively within predetermined upper and lower limits, each of said signals having an amplitude within the respective upper and lower limits in response to said color components of a desired document; and developing an indicating signal in response to each of said first-named signals being within said limits, thereby indicating that the spectral content of each of said areas conforms to that of a desired document.

7. Apparatus for discriminating between des'red and undesired documents by spectral analysis of light reflected therefrom comprising: light source means emitting visible light in a plurality of color sections including respective color components existing on one surface of a desired document; means for receiving a document to be inspected and for holding the same in stationary relationship with respect to said light source means with said one surface exposed thereto so as to receive light therefrom, means for defining a plurality of preselected spaced-apart discrete areas on said one surface, said discrete areas being respectively relatively small compared with the total area of said one surface; a plurality of light-sensitive means for respectively developing electrical signals having amplitudes responsive to the spectral content of the light received thereby, said light-sensitive means being disposed respectively to receive light reflected from said discrete areas thereby respectively to develop said signals in response to the spectral characteristics of each of said areas; and means for analyzing each of said signals and including means for developing an indicating signal when the spectral content of the light reflected from each of said areas conforms to that of a desired document.

8. Apparatus for discriminating between desired and undesired documents by spectral analysis of light reflected therefrom comprising: a source of visible light having spectral emission over a band of wave-lengths including those of the color components of one surface of a desired document and at least one color component of an undesired document; means for receiving a document to be inspected and for holding the same in stationary relationship with respect to said source with said one surface exposed to said source so as to receive light therefrom; a plurality of light-sensitive means for respectively developing electrical signals having amplitudes responsive to the spectral content of the light received thereby, said light-sensitive means being disposed at a plurality of locations respectively to receive light reflected from a plurality of preselected discrete areas of said one surface thereby respectively to develop said signals in response to the spectral characteristics of said areas; each of said light-sensitive means having maximum sensitivity to a color section included in said band of wavelengths, at least a first of said light-sensitive means having maximum sensitivity to one of said color components of a desired document, at least a second of said light-sensitive means having maximum sensitivity to said one color component of an undesired document; and means for analyzing each of said signals and including means for developing an indicating signal when the spectral content of the light reflected from each of said areas conforms to that of a desired document.

9. Apparatus for discriminating between desired and undesired documents by spectral analysis of light reflected therefrom comprising: a source of visible light having spectral emission over a band of wavelengths including those of the color components of one surface of a desired document and at least one color component of an undesired document; means for receiving a document to be inspected and for holding the same in stationary relationship with respect to said source with said one surface exposed to said source so as to receive light therefrom; a plurality of light-sensitive means for respectively developing electrical signals having amplitudes responsive to the spectral content of the light received thereby, said light-sensitive means being disposed at a plurality of locations respectively to receive light reflected from a plurality of preselected discrete areas of said one surface thereby respectively to develop said signals in response to the spectral characteristics of each of said areas; each of said light-sensitive means having maximum sensitivity to a color section included in said band of wavelengths, at least a first of said light sensitive means having maximum sensitivity to one of said color components of a desired document, at least a second of said light-sensitive means having maximum sensitivity to a different one of said color components of a desired document, as least a third of said light-sensitive means having maximum sensitivity to said one color component of an undesired document; and means for analyzing each of said signals and including means for developing an indicating signal when the spectral content of the light reflected from each of said areas conforms to that of a desired document.

10. Apparatus for discriminating between desired and undesired documents by spectral analysis of light reflected therefrom comprising: light source means emitting visible light in a plurality of color sections including respective color components existing on one surface of a desired document; means for receiving a document to be inspected and for holding the same in an inspection position in stationary relationship with respect to said source with said one surface exposed to said source so as to receive light therefrom; a plurality of light-sensitive means for respectively developing electrical signals having amplitudes responsive to the spectral content of the light received thereby, said light-sensitive means being disposed at a plurality of locations respectively to receive light reflected from a plurality of preselected spaced-apart discrete areas of said one surface thereby respectively to develop said signals in response to the spectral characteristics of each of said areas, said areas being respectively relatively small compared to the total area of said one surface; means for directing the amplitudes of each of said signals to determine whether said signals are respectively within predetermined upper and lower limits; and means for providing an indicating signal in response to all of said first-named signals being within said limits thereby indicating that the spectral characteristics of each of said areas conforms to that of a desired document.

11. Apparatus for discriminating between desired and undesired documents by spectral analysis of light reflected therefrom comprising: light source means emitting visible light in a plurality of color sections including respective color components existing on one surface of a desired document; means for receiving a document to be inspected and for holding the same in an inspection position in stationary relationship with respect to said source with one surface exposed to said source so as to receive light therefrom; means for defining a plurality of preselected spaced-apart discrete areas on said one surface of said document in said inspection position, said areas being respectively relatively small compared with the total area of said one surface; a plurality of light-sensitive means for respectively developing electrical signals having amplitudes responsive to the spectral content of the light received thereby, said light-sensitive means being disposed at a plurality of locations respectively to receive light reflected from said discrete areas thereby respectively to develop said signals in response to the spectral characteristics of each of said areas; means for detecting the amplitudes of each of said signals to determine whether said signals are respectively within predetermined upper and lower limits, each of said signals having an amplitude within the respective upper and lower limits in response to said color components of a desired document; and means for providing an indicating signal in response to all of said first-named signals being within said limits thereby indicating that the spectral characteristics of each of said areas conforms to that of a desired document.

12. Apparatus for discriminating between desired and undesired documents by spectral analysis of light reflected therefrom comprising: light source means emitting visible light in a plurality of color sections including respective color components existing on one surface of a desired document; means for receiving a document to be inspected and for holding the same in an inspection position in stationary relationship with respect to said source with said one surface exposed to said source so as to receive light therefrom; said receiving means including means for moving said document between a loading position and said inspection position; a plurality of light-sensitive means for respectively developing electrical signals having amplitudes responsive to the spectral content of the light received thereby, said light-sensitive means being disposed at a plurality of locations respectively to receive light reflected therefrom from a plurality of preselected discrete areas of said one surface thereby respectively to develop said signals in response to the spectral characteristics of such of said areas; means for detecting the amplitudes of each of said signals to determine whether said signals are respectively within predetermined upper and lower limits; means for providing an indicating signal in response to all of said first-named signals being within said limits thereby indicating that the spectral characteristics of each of said areas conforms to that of a desired document; and cooperating relatively movable jaw means for selectively clampingly engaging said document in said inspection position, actuating means for moving said jaw means into engagement with said document in response to said indicating signal thereby to remove said document from said movable means as the same is returned to said loading position thereof, and means for detecting removal of said document from said moving means and for providing another indicating signal in response thereto, said actuating means moving said jaw means out of engagement with said document in response to said other indicating signal thereby to release said document.

13. Apparatus for discriminating between desired and undesired documents by spectral analysis of light reflected therefrom comprising: light source means emitting visible light in a plurality of color sections including respective color components existing on one surface of a desired document; means for receiving a document to be inspected and for holding the same in an inspection position in stationary relationship with respect to said source with said one surface exposed to said source so as to receive light therefrom; said receiving means including means for moving said document between a loading position and said inspection position; a plurality of light-sensitive means for respectively developing electrical signals having amplitudes responsive to the spectral content of the light received thereby, said light-sensitive means being disposed at a plurality of locations respectively to receive light reflected from a plurality of preselected discrete areas of said one surface thereby respectively to develop said signals in response to the spectral characteristics of each of said areas; means for detecting the amplitudes of each of said signals to determine whether said signals are respectively within predetermined upper and lower limits; means for providing an indicating signal in response to all of said first-named signals being within said limits thereby indicating that the spectral characteristics of each of said areas conforms to that of a desired document; and means for selectively clamping said document in said inspection position in response to said indicating signal thereby to remove said document from said movable means as the same is returned to said loading position thereof, another photosensitive means disposed to receive light from said source as said movable means is moved toward said loading position thereof with no document therein and providing another indicating signal in response thereto, said clamping means releasing said document in response to said other indicating signal.

14. Apparatus for discriminating between desired and undesired documents by spectral analysis of light reflected therefrom comprising: light source means emitting visible light; means for receiving a document to be inspected and for holding the same in an inspection position in stationary relationship with respect to said source with one surface exposed to said light source means so as to receive light therefrom; a plurality of light-sensitive means for respectively developing electrical signals having amplitudes responsive to the spectral content of the light received thereby, said light-sensitive means being disposed at a plurality of locations respectively to receive light reflected from a plurality of preselected discrete areas of said one surface thereby respectively to develop said signals in response to the spectral characteristics of each of said areas including high and low limit relay means coupled to each of said light-sensitive means and respectively energized thereby for simultaneously determining whether said signals are respectively within predetermined high and low limits, said detector means including output circuit means for providing an indicating signal when each of said low limit relay means is energized and none of said high limit relay means is energized thereby indicating that the spectral characteristics of each of said areas conforms to that of a desired document.

15. The apparatus of claim 14 wherein said output circuit means comprises contacts on each of said relays, said contacts being coupled in series and completing a series circuit to provide said indicating signal.

16. Apparatus for discriminating between desired and undesired documents by spectral analysis of light reflected therefrom comprising: light source means emitting visible light in a plurality of color sections including respective color components existing on one surface of a desired document; means for receiving a document to be inspected and for holding the same in an inspection position in stationary relationship with respect to said source with said one surface exposed to said source so as to receive light therefrom; said receiving means including means for moving said document between a loading position and said inspection position; a plurality of light-sensitive means for respectively developing electrical signals having amplitudes responsive to the spectral content of the light received thereby, said light-sensitive means being disposed at a plurality of locations respectively to receive light reflected from a plurality of preselected discrete areas of said one surface thereby respectively to develop said signals in response to the spectral characteristics of each of said areas; means for detecting the amplitudes of each of said signals to determine whether said signals are respectively within predetermined upper and lower limits; means for providing an indicating signal in response to all of said first-named signals being within said limits thereby indicating that the spectral characteristics of each of said areas conforms to that of a desired document; and selectively actuable means for clamping said document in said inspection position thereby to remove said document from said movable means as the same is returned to said loading position thereof, means for detecting removal of said document from said moving means and for providing another indicating signal in response thereto, first relay means energized in response to said first-named indicating signal and coupled to actuate said clamping means, second relay means energized in response both to energization of said first relay means and said other indicating signal, and control circuit means for developing a control signal in response to energization of said second relay means.

17. The apparatus of claim 16 wherein said first and second relay means are respectively latching relays each having an "on" coil and an unlatch coil, said "on" coil of said first relay means being coupled for energization in response to said first-named indicating signal, said "on" coil of said second relay means being coupled for energization in response both to energization of said "on" coil of said first relay means and said other indicating signal, an output circuit, pulsing means coupling said control circuit means and said output circuit for providing two successive output pulses in said output circuit in response to said control signal, and means coupling said pulsing means to said unlatch coil of said first relay means for energizing the same in response to the second of said output pulses, said first relay means being coupled to said unlatch coil of said second relay means and energizing the same in response to energization of said unlatch coil of said first relay means.

18. The apparatus of claim 16 further comprising timing means coupled to said first relay means for initiating a timing cycle in response to energization of said first relay means, and an output circuit, said timing means including means for coupling said control circuit to said output circuit for predetermined times during said timing cycle thereby to provide predetermined output signals in said output circuit in response to said control signal, said timing means including means for de-energizing said first and second relay means at the end of said timiing cycle.

19. The apparatus of claim 16 further comprising switch means having first contacts which are closed when said moving means is in said loading position thereof, each of said first and second relay means having an operating coil and contacts, said first relay coil being coupled to said signal amplitude detecting means for energization in response to said first indicating signal, a timing motor for providing a timing cycle and having unlatch, index, and at least one output pulse contacts actuated thereby during a timing cycle, said unlatch contacts being normally closed and being momentarily opened adjacent the end of the timing cycle, said index contacts being normally open and closed during a timing cycle, said first relay means having sealing contacts serially coupling said unlatch contacts with said first relay coil in response to energization thereof whereby said first relay coil remains energized during a timing cycle despite termination of said first-named indicating signal and is de-energized adjacent the end of a timing cycle, said first relay means having contacts serially coupling said first contacts with said timing motor for energization thereof in response to energization of said first relay coil when said first contacts are closed, said first relay means having contacts serially coupling said index contacts with said timing motor for energization thereof in response to de-energization of said first relay coil whereby a timing cycle is completed following de-energization of said first relay coil, said second relay coil being coupled to said document removal detecting means for energization in response to said other indicating signal, said second relay means having sealing contacts serially coupling contacts of said first relay means with said second relay coil in response to energization of both said first and second relay coils whereby said second relay coil remains energized during energization of said first relay coil despite termination of said other indicating signal, and an output circuit, said second relay means having contacts serially connecting said output pulse contacts with said output circuit in response to energization of said second relay coil whereby output pulses are provided in said output circuit in response to closing of said pulse contacts by said timing motor.

20. Apparatus for discriminating between desired paper currency in which one surface thereof has predetermined color components and spectral characteristics and undesired paper currency by spectral analysis of light reflected therefrom comprising: a source of visible light having spectral emission over a band of wavelengths including those of the color components of said one surface of a desired piece of currency and at least one color component of an undesired piece of currency, said source having substantial emission in the section of at least one of said color components of a desired piece of currency; means for receiving a piece of currency and including means for moving the same between a loading position and an inspection position, said receiving means in said inspection position holding said piece of currency stationary with respect to said source with said one surface exposed thereto so as to receive light therefrom; a plurality of light-sensitive means for respectively developing electrical signals having amplitudes responsive to the spectral content of the light received thereby, said light-sensitive means being disposed at a plurality of locations respectively to receive light reflected from a plurality of preselected discrete areas of said one surface thereby respectively to develop said signals in response to the spectral characteristics of each of said areas, each of said light-sensitive means having maximum sensitivity to a color section included in said band of wavelengths, at least a first of said light-sensitive means having maximum sensitivity to one of said color components of a desired piece of currency, at least a second of said light sensitive means having maximum sensitivity to a different one of said color components of a desired piece of currency, at least a third of said light-sensitive means having maximum sensitivity to said one color component of an undesired piece of currency; high and low limit signal amplitude detecting means respectively coupled to each of said light-sensitive means for determining whether said signals are respectively within predetermined upper and lower limits, said detecting means including circuit establishing means for developing an indicating signal when all of said first-named signals are within said limits thereby indicating that the spectral characteristics of each of said areas conforms to that of a desired piece of currency; means for selectively clamping said piece of currency while in said receiving means in response to said indicating signal thereby to remove said piece of currency from said receiving means as the same is returned to said loading position thereof; means for sensing removal of said piece of currency from said receiving means and for providing another indicating signal in response thereto; and means for providing an output signal in response to both of said indicating signals.

21. Apparatus for discriminating between desired and undesired documents by spectral analysis of light reflected therefrom comprising: light source means emitting visible light in a plurality of color sections including respective color components existing on one surface of a desired document; means for receiving a document to be inspected and for holding the same in an inspection position in stationary relationship with respect to said source with said one surface exposed to said source so as to receive light therefrom; said receiving means exposing an enlarged area of said one surface of said document to said source; a plurality of light-sensitive means for respectively developing electrical signals having amplitudes responsive to the spectral content of the light received thereby, said light-sensitive means being disposed at a plurality of locations respectively to receive light reflected from a plurality of preselected discrete areas of said one surface thereby respectively to develop said signals in response to the spectral characteristics of each of said areas; each of said photosensitive means including means for restricting its field of view to the respective preselected area, said preselected areas being within said enlarged area; means for detecting the amplitudes of each of said signals to determine whether said signals are respectively within predetermined upper and lower limits; and means for providing an indicating signal in response to all of said first-named signals being within said limits thereby indicating that the spectral characteristics of each of said areas conforms to that of a desired document.

References Cited by the Examiner
UNITED STATES PATENTS

| | | | |
|---|---|---|---|
| 2,827,822 | 3/1958 | Timms. | |
| 2,882,785 | 4/1959 | Biesele | 209—111.6 |
| 2,932,392 | 4/1960 | Burtner | 209—111.6 |
| 2,941,187 | 6/1960 | Simjian. | |
| 2,950,799 | 8/1960 | Timms | 209—111.6 |
| 3,108,693 | 10/1963 | Patzer | 194—4 |
| 3,109,100 | 10/1963 | Gecewicz | 194—4 |
| 3,114,444 | 12/1963 | Patzer | 194—4 |
| 3,114,445 | 12/1963 | Steiner | 144—4 |
| 3,133,201 | 5/1964 | Rock | 209—111.6 |

M. HENSON WOOD, JR., *Primary Examiner.*

ROBERT B. REEVES, *Examiner.*

UNITED STATES PATENT OFFICE
CERTIFICATE OF CORRECTION

Patent No. 3,220,549                                            November 30, 1965

Lan J. Wong

It is hereby certified that error appears in the above numbered patent requiring correction and that the said Letters Patent should read as corrected below.

Column 3, line 38, for "show" read -- shows --; line 69, for "stray" read -- tray --; column 7, line 31, strike out the commas, second and third occurrences, and insert instead -- and --; column 9, line 28, for "responsive" read -- response --; column 16, line 7, for "suply" read -- supply --; column 22, line 63, for "des red" read -- desired --; column 24, line 17, for "directing" read -- detecting --.

Signed and sealed this 10th day of January 1967.

(SEAL)
Attest:

ERNEST W. SWIDER                                  EDWARD J. BRENNER
Attesting Officer                                           Commissioner of Patents